US011893553B1

(12) United States Patent
Kurani et al.

(10) Patent No.: US 11,893,553 B1
(45) Date of Patent: Feb. 6, 2024

(54) SYSTEMS AND METHODS OF EXCHANGING DIGITAL ASSETS USING A PUBLIC KEY CRYPTOGRAPHY (PKC) FRAMEWORK

(71) Applicant: Wells Fargo Bank, N.A., San Francisco, CA (US)

(72) Inventors: Ashish B. Kurani, Hillsborough, CA (US); Michael Knorr, Fairfield, CT (US); Erik F. Nelson, San Francisco, CA (US); Matthew Mullin Shepherd, Charlotte, NC (US); Laura Marie Fontana, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 66 days.

(21) Appl. No.: 17/528,455

(22) Filed: Nov. 17, 2021

(51) Int. Cl.
*G06Q 20/06* (2012.01)
*G06Q 20/22* (2012.01)
*G06Q 20/38* (2012.01)

(52) U.S. Cl.
CPC ....... *G06Q 20/0655* (2013.01); *G06Q 20/223* (2013.01); *G06Q 20/3827* (2013.01); *G06Q 2220/00* (2013.01)

(58) Field of Classification Search
CPC ............ G06Q 20/0655; G06Q 20/223; G06Q 20/3827; G06Q 2220/00
See application file for complete search history.

(56) References Cited

U.S. PATENT DOCUMENTS

| | | | |
|---|---|---|---|
| 11,250,142 B1* | 2/2022 | Wu | H04L 9/0819 |
| 2017/0317997 A1* | 11/2017 | Smith | G06Q 20/38215 |
| 2020/0167773 A1* | 5/2020 | Cervenka | G06Q 20/10 |
| 2020/0186341 A1* | 6/2020 | Stein | H04L 9/3239 |
| 2020/0313897 A1* | 10/2020 | Heath | G06Q 10/0832 |
| 2020/0334668 A1* | 10/2020 | Nicli | G06Q 20/389 |
| 2020/0394651 A1* | 12/2020 | Kreder, III | G06Q 20/02 |
| 2021/0073913 A1* | 3/2021 | Ingargiola | H04L 67/104 |
| 2023/0119035 A1* | 4/2023 | Mee | H04L 9/50 |
| | | | 705/75 |

* cited by examiner

*Primary Examiner* — John W Hayes
*Assistant Examiner* — Yingying Zhou
(74) *Attorney, Agent, or Firm* — Foley & Lardner LLP

(57) ABSTRACT

Systems, methods, and computer-readable storage media of exchanging digital assets using a public key cryptography framework. One method includes storing a plurality of digital assets on an internal ledger, and receiving a signed exchange request signed by a private key of a public and private key pair associated with a digital asset on the internal ledger, wherein the signed exchange request includes a destination address of an inter-provider ledger. The method further includes providing, to the inter-provider ledger, a public key of the public and private key pair based on interfacing with the destination address of the inter-provider ledger via a first API, and determining, from the inter-provider ledger, the signed exchange request was verified. The method further includes updating the internal ledger by removing the public and private key pair, and updating a central ledger by interfacing with a central address of the central ledger via a second API.

20 Claims, 7 Drawing Sheets

SYSTEMS AND METHODS OF EXCHANGING DIGITAL ASSETS USING A PUBLIC KEY CRYPTOGRAPHY (PKC) FRAMEWORK

CROSS-REFERENCE TO RELATED APPLICATIONS

This application is related to U.S. patent application Ser. No. 17/528,352, titled "Systems and Methods of Digital Asset Wrapping Using a Public Key Cryptography (PKC) Framework," filed on the same day as the present application, and U.S. patent application Ser. No. 17/528,460, titled "Systems and Methods of Template-Based Digital Asset Exchanges Using a Public Key Cryptography (PKC) Framework," filed on the same day as the present application, all of which are incorporated herein by reference in their entireties and for all purposes.

BACKGROUND

The present disclosure relates generally to the field of digital asset technology. In a computer networked environment such as the internet, users and entities such as people or companies exchange goods and services using digital assets.

SUMMARY

Some arrangements relate to a computer-implemented method of exchanging digital assets using a public key cryptography (PKC) framework, the method implemented by one or more processing circuits. The method includes storing a plurality of digital assets on an internal ledger. Further, the method includes receiving a signed exchange request signed by a private key of a public and private key pair associated with a digital asset on the internal ledger, wherein the signed exchange request includes a destination address of an inter-provider ledger. Further, the method includes providing, to the inter-provider ledger, a public key of the public and private key pair based on interfacing with the destination address of the inter-provider ledger via a first application programming interface (API). Further, the method includes determining, from the inter-provider ledger, the signed exchange request was verified. Further, the method includes in response to determining that the signed exchange request was verified, updating the internal ledger by removing the public and private key pair, and in response to determining that the signed exchange request was verified, updating a central ledger by interfacing with a central address of the central ledger via a second API.

In some arrangements, each digital asset of the plurality of digital assets includes a plurality of fields, and wherein the plurality of fields includes at least an assignee field. In various arrangements, the assignee field has a read/write access level, and wherein the digital asset further includes a trace field associated with a unique identifier and assigned a read access level. In some arrangements, the digital asset is a central bank digital currency (CBDC) issued by the central ledger, and wherein the CBDC is a digital form of a fiat currency of one or more nations, one or more countries, or one or more regions. In various arrangements, the central ledger includes a plurality of nodes each associated with one or more providers, and wherein the central address is unique to the one or more processing circuits, and wherein the one or more processing circuits includes a read/write access level for updating the central ledger. In some arrangements, the digital asset is a token derived from a central bank digital currency (CBDC) issued by the central ledger, and wherein the token is a digital form of a fiat currency of one or more nations, one or more countries, or one or more regions. In various arrangements, the method further includes establishing, utilizing the first API, a data feed associated with the signed exchange request, and monitoring the data feed including executing API calls with the API, wherein the API calls return a verification status of the signed exchange request. In some arrangements, the internal ledger is operated by the one or more processing circuits, and wherein the inter-provider ledger includes a plurality of nodes each associated with one or more providers. In various arrangements, a source address associated with the one or more processing circuits is a first node of the plurality of nodes on the inter-provider ledger, and wherein the destination address is a second node of the plurality of nodes on the inter-provider ledger.

Some arrangements relate to a provider system with at least one processing circuit having at least one processor coupled to at least one memory. The one processing circuit can be configured to store a plurality of digital assets on an internal ledger. Further, the at least one processing circuit can be configured to receive a signed exchange request signed by a private key of a public and private key pair associated with a digital asset on the internal ledger, wherein the signed exchange request includes a destination address of an inter-provider ledger. Further, the at least one processing circuit can be configured to provide, to the inter-provider ledger, a public key of the public and private key pair based on interfacing with the destination address of the inter-provider ledger via a first application programming interface (API). Further, the at least one processing circuit can be configured to determine, from the inter-provider ledger, the signed exchange request was verified. Further, the at least one processing circuit can be configured to in response to determining that the signed exchange request was verified, update the internal ledger by removing the public and private key pair, and in response to determining that the signed exchange request was verified, update a central ledger by interfacing with a central address of the central ledger via a second API.

In some arrangements, each digital asset of the plurality of digital assets includes a plurality of fields, and wherein the plurality of fields includes at least an assignee field. In various arrangements, the assignee field has a read/write access level, and wherein the digital asset further includes a trace field associated with a unique identifier and assigned a read access level. In some arrangements, the digital asset is a central bank digital currency (CBDC) issued by the central ledger, and wherein the CBDC is a digital form of a fiat currency of one or more nations, one or more countries, or one or more regions. In various arrangements, the central ledger includes a plurality of nodes each associated with one or more providers, and wherein the central address is unique to the at least one processing circuit, and wherein the at least one processing circuit includes a read/write access level for updating the central ledger. In some arrangements, the digital asset is a token derived from a central bank digital currency (CBDC) issued by the central ledger, and wherein the token is a digital form of a fiat currency of one or more nations, one or more countries, or one or more regions. In various arrangements, the at least one processing circuit can be further configured to establish, utilizing the first API, a data feed associated with the signed exchange request, and monitor the data feed including executing API calls with the API, wherein the API calls return a verification status of the signed exchange request. In some arrangements, the internal ledger is operated by the at least one processing circuit, and wherein the inter-provider ledger includes a plurality of nodes each associated with one or more providers. In various arrangements, a source address associated with the at least one processing circuit is a first node of the plurality of nodes on the inter-provider ledger, and wherein the destination address is a second node of the plurality of nodes on the inter-provider ledger.

Some arrangements relate to one or more computer-readable storage media having instructions stored thereon that, when executed by at least one processing circuit, cause the at least one processing circuit to store a plurality of digital assets on an internal ledger. Further, the one or more computer-readable storage media having instructions stored thereon that, when executed by at least one processing circuit, cause the at least one processing circuit to receive a signed exchange request signed by a private key of a public and private key pair associated with a digital asset on the internal ledger, wherein the signed exchange request includes a destination address of an inter-provider ledger. Further, the one or more computer-readable storage media having instructions stored thereon that, when executed by at least one processing circuit, cause the at least one processing circuit to provide, to the inter-provider ledger, a public key of the public and private key pair based on interfacing with the destination address of the inter-provider ledger via a first application programming interface (API). Further, the one or more computer-readable storage media having instructions stored thereon that, when executed by at least one processing circuit, cause the at least one processing circuit to determine, from the inter-provider ledger, the signed exchange request was verified. Further, the one or more computer-readable storage media having instructions stored thereon that, when executed by at least one processing circuit, cause the at least one processing circuit to in response to determining that the signed exchange request was verified, update the internal ledger by removing the public and private key pair, and in response to determining that the signed exchange request was verified, update a central ledger by interfacing with a central address of the central ledger via a second API.

In some arrangements, the internal ledger is operated by the at least one processing circuit, and wherein the inter-provider ledger includes a plurality of nodes each associated with one or more providers, and wherein a source address associated with the at least one processing circuit is a first node of the plurality of nodes on the inter-provider ledger, and wherein the destination address is a second node of the plurality of nodes on the inter-provider ledger.

Figure 1:
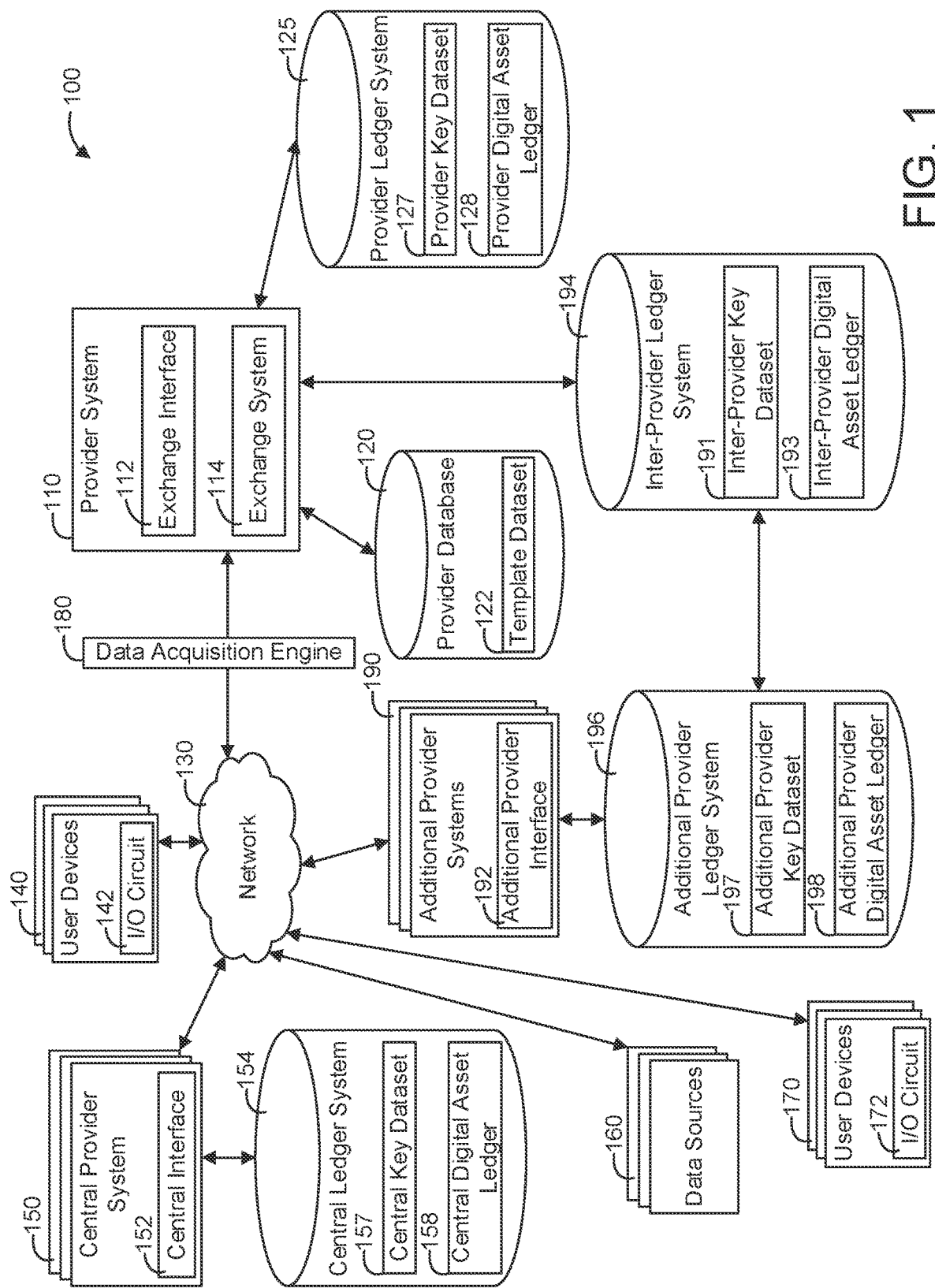
FIG. 1 is a block diagram depicting an example of a cryptography framework, according to some arrangements.

It will be recognized that some or all of the FIGS. are schematic representations for purposes of illustration. The FIGS. are provided for the purpose of illustrating one or more embodiments with the explicit understanding that they will not be used to limit the scope or the meaning of the claims.

DETAILED DESCRIPTION

Referring generally to the FIGS., the systems and methods relate generally to exchanging digital assets using a cryptography framework. In some arrangements, the causal framework can include one or more ledger networks that can be hosted by one or more computing systems. In particular, the one or more ledger networks can store digital currency (also referred to as "digital money," "electronic money," or "electronic currency"), control the creation of additional digital currency, destroy digital currency, and verify the transfer of assets.

As used herein, a "digital asset" may be a data package or structure including information (e.g., values in fields) and an amount of digital currency that is owned by one or more parties (e.g., user, individual, institution, company, or so on) and used to perform exchanges (e.g., for goods or services) in a computer network environment. The digital asset may be encrypted and decrypted using one or more public and private key pairs (sometimes referred to as a "verification and signing key pair"). In some arrangements, a digital asset may be a digital form of a fiat currency of one or more nations, one or more countries, or one or more regions. In some arrangements, the digital asset may be issued by a central provider (e.g., Federal Reserve System (FRS)), or by a specific provider (e.g., bank). The digital asset may be a CBDC or derived (for example, as a token) from a CBDC. In various arrangements, the digital asset can include information in one or more fields that may be modified by the one or more parties. Furthermore, the one or more attributes (e.g., smart contracts) configured to provide one or more functionalities of the digital asset can be wrapped into the data package of the digital asset. Thus, the digital asset can be a wrapper package that can include one or more data packages wrapped together.

As used herein, a "wrapper" may be a computer program (also known as a program, software, software application, script, or code) configured to combine one or more functionalities (e.g., CBDC (linked to USD), provider specific fields, user smart contracts) of a plurality of data packages together to create a single wrapped data package. In some arrangements, the one or more processing circuits described herein can implement and execute a wrapper to append or update a digital asset to include one or more data structures storing attributes and conditions (e.g., smart contracts), fields, a value, and so on. The wrapper can be written in any form of programming language, including compiled or interpreted languages, and/or declarative or procedural languages, and it can be deployed in any form, including as a stand-alone program or as a circuit, component, subroutine, object, or other unit suitable for use in a computing environment. A wrapper may, but need not, correspond to a file in a file system. A wrapper can be stored in a portion of a file that holds other programs or data (e.g., one or more scripts stored in a markup language document), in a single file dedicated to the wrapper in question, or in multiple coordinated files (e.g., files that store one or more subsystems, sub-programs, or portions of code). A wrapper can be deployed to be executed on one computer or on multiple computers that are located at one site or distributed across multiple sites and interconnected by a communication network. The processes and logic flows described in this specification can be performed by one or more programmable processors executing one or more wrappers (or computer programs) to perform actions by operating on input data (e.g., digital assets) and generating output (e.g., wrapped digital asset).

Generally, cryptocurrency users can store their cryptocurrency in digital wallets (e.g., provider-owned, user-owned), where the purchase, sale, and exchanges occur in blocks. Each block connects to the previous block by means of a code, based on ledger technology. In some arrangements, cryptocurrency runs on a ledger, which can be shared ledger, central ledger, or a document duplicated several times across a network of computers ("nodes"). Every single exchange made and the ownership of every single cryptocurrency in circulation is recorded in the ledger. As such, the nodes of the ledger or ledger network can prevent invalid exchanges from taking place.

However, transferring digital currency such as cryptocurrency between multiple ledger networks (e.g., central, provider, and inter-provider ledger) creates problems. Firstly, a ledger network operating a digital currency (e.g., CBDC) including unique provider attributes and conditions associated with provider X cannot communicate with a ledger network operating the digital currency including unique provider attributes and conditions associated with provider Y, due to at least their incompatible communication protocols. Furthermore, even if the ledger networks could communicate with one another, there is no mechanism for preventing the double-spending of the digital currency as it traverses across the networks because each ledger network manages an entirely different electronic ledger. As such, the nodes of one ledger network would be unable to verify and concretize the exchanges of cryptocurrencies involving another ledger network. Accordingly, the present disclosure is directed to systems and methods for facilitating exchanges of digital currency that transfers between multiple ledger networks and multiple entities and/or users.

Cryptocurrency is currently a two trillion-dollar market that continues to grow. However, cryptocurrency is mostly unregulated by federal government entities (e.g., Securities and Exchange Commission (SEC), commodity futures trading commission (CFTC)). In many systems, federal government entities across the globe face obstacles and difficulties in regulating the exchange of cryptocurrencies because exchanges are typically anonymous. In particular, assets (e.g., cryptocurrency) are exchanged on ledger networks such that each exchange includes a destination address. The destination address is unique since each exchange on the ledger network can include a unique, single-use address that is provided to a sender to initiate an exchange. The design of the destination address provides protection and privacy to assets by removing the ability to link exchanges to each other. However, users and entities exploit this design in trying to avoid taxes and other regulations from federal government entities. Furthermore, these exchanges without oversight or regulations are not insured (e.g., by the Federal Deposit Insurance Corporation (FDIC), by a provider such as a bank or credit card company, or by an insurance company) and users and entities can be exploited (e.g., hacked, defrauded, deceived, tricked, and so on) without a remedy or recourse.

Accordingly, the ability to have centralized control of digital currency across one or more ledgers (e.g., centralized, provider, inter-provider, and so on), such as assigning attributes to digital currency, administering exchanges across ledger networks, and utilizing templates to facilitate payments to two or more entities, provides providers and clients enhanced visibility and improved security into digital currency exchanges on ledger networks. Additionally, decentralized ledgers are constantly verifying the accuracy of exchanges occurring on the distributed ledger (e.g., DLT), which require significant computer bandwidth and storage capacity. Thus, the causal design with centralized control of digital currency that can assign attributes to digital currency, administer exchanges across ledger networks, and utilize templates to facilitate payments to two or more entities, eliminates and/or reduces the processing load and provides improved storage capacity to provider computing systems when attempting to verify and sign exchanges on a ledger network. Therefore, aspects of the present disclosure address problems in ledger technology by providing significant improvement to a cryptography framework and interoperability that is regulated across users, entities, and providers of digital currency.

Furthermore, while cryptocurrency is a two trillion-dollar market currency, many users and entities are presented with challenges in accepting and exchanging cryptocurrencies with products and/or services they may offer. Those challenges can include, but are not limited to, certainty in cryptocurrency, speculation, fluctuation, little benefit in accepting cryptocurrency, native value, and so on. Generally, cryptocurrency, such as Bitcoin, Ethereum, Dogecoin, and so on, are tied to a market value determined by supply and demand and, unlike stocks, can change anytime during the day or night (e.g., 24/7). The challenges arise because users or entities lack confidence in what the value will be in a few seconds, minutes, hours, or days.

For example, company ABC buys product X for $1,500 USD from supplier DFW and sells product X in company ABC's marketplace (e.g., in-store, online, and so on) to consumers for $1,750 USD. In this example, if company ABC accepts credit cards and cash, when a consumer buys product X for $1,750 USD with a credit card, company ABC will receive $1,750 USD. However, in this example, if company ABC also accepts Bitcoin, a customer may buy the product for an equivalent amount of USD in Bitcoin (e.g., 0.05 Bitcoin), but after (e.g., seconds or minutes later) company ABC accepts the equivalent amount of Bitcoin, the value may drop below $1,500. As shown, this type of example is why companies (e.g., such as company ABC) will not accept Bitcoin, as it can be uncertain, speculative, fluctuate greatly in a small period of time, and lacks a link to a native currency value (e.g., USD, EUR, CAD, GMP, JPY, and so on).

Accordingly, the ability to have centralized control of digital currency across one or more ledgers (e.g., centralized, provider, inter-provider, and so on), such as assigning a value based on a fiat currency of one or more nations, countries, or regions, wrapping digital currency with one or more attributes (e.g., conditions, templates), and facilitating exchanges across ledgers, provides providers and customers improved security and enhanced certainty in digital currency exchanges on ledger networks. This causal framework provides significant improvements to users and entities by allowing the exchange of digital currency linked to a fiat currency while maintaining and reducing uncertainty, speculation, and fluctuation when digital currency is exchanged. Therefore, aspects of the present disclosure also address problems in ledger technology by providing significant improvement to a cryptography framework and interoperability across systems that includes one or more digital currencies derived from a CBDC issued by a central provider and linked to a fiat currency.

Moreover, in many systems, cryptocurrencies use decentralized control as opposed to centralized digital currency and central banking systems. The decentralized control of each cryptocurrency works through distributed ledger technology (DLT), such as a blockchain that serves as an electronic public financial transaction database. Oftentimes, decentralized control of cryptocurrency can invite and lead to hackers, criminals, and other parties requesting payment in cryptocurrency because it can be undetectable to investigators, law enforcement, and federal governments. Recently, cyber-incidents (e.g., data breaches, ransomware, cyberattacks (e.g., phishing attacks, malware attacks, web attacks, and artificial intelligence (AI)-powered attacks), and other detrimental cyber-incidents) have occurred and plagued various entities across the globe, and oftentimes the hackers request payment in decentralized cryptocurrency such as Bitcoin, Ethereum, Dogecoin, and so on. Many times, the cyber-incidents are publicized and entities' and/or users' sensitive data (e.g., deoxyribonucleic acid (DNA), social security numbers (SSN), passport numbers, financial account numbers, payment card industry (PCI) data, other personal identifying information, and so on) can be collected and broadcasted to the ledger (e.g., DLT) and/or internet, thereby exposing the sensitive data, and thus increasing the risk of additional cyber-incidents.

Accordingly, the ability to have centralized control of digital currency across one or more ledgers (e.g., centralized, provider, inter-provider, and so on), such as assigning attributes to digital currency, administering exchanges across ledger networks, and utilizing templates to facilitate payments to two or more entities, provides providers and clients enhanced visibility and security into digital currency exchanges on ledger networks. This causal framework that maintains and protects the sensitive data provides significant improvements to cybersecurity of entities and users by improving network security (e.g., the computer networked environment of the entity does not include sensitive data), infrastructure security (e.g., parties may not attempt to exchange digital currency with a centralized control), technology security (e.g., eliminate decentralized data silos that are susceptible to cyber-incidents (i.e., reduce "attack surface")), and data security (e.g., digital currency centralization improves analytical reporting, data governance, maintenance). Thus, this causal framework enables users and entities to exchange digital currency linked to a fiat currency while maintaining and protecting the sensitive data. Therefore, aspects of the present disclosure also address problems in ledger technology by providing a centralized exchange that utilizes attributes, wrappers, templates, and ledger communication protocols to maintain and facilitate digital currency exchanges on one or more ledger networks.

Referring now to FIG. 1, a block diagram depicting an example of a cryptography framework 100 is shown, according to some arrangements. The cryptography framework 100 is shown to include a provider system 110, user devices 140, central provider system 150, data sources 160, third-party devices 170, and additional provider systems 190. The plurality of devices and/or systems 110, 140, 150, 160, 170, and/or 190 may initiate, collect, and/or route (e.g., provide) data over network 130. The data acquisition engine 180 may provide a single application programming interface (API) or multiple APIs to access various data generated, stored, or routed by devices and systems 110, 140, 150, 160, 170, and/or 190.

In general, the one or more processing circuits can include a microprocessor, an application specific integrated circuit (ASIC), a field-programmable gate array (FPGA), and so on, or combinations thereof. A memory can include, but is not limited to, electronic, optical, magnetic, or any other storage or transmission device capable of providing processor with program instructions. Instructions can include code from any suitable computer programming language. The memory may also store parameter data to affect presentation of one or more resources, exchanges of one or more digital currencies, attributes of one or more digital currencies, and so on, on the computing devices and/or systems.

The one or more user devices 140 (e.g., smartphones, tablets, computers, etc.) may be used by a user to perform various actions and/or access various types of content (e.g., marketplace), some of which may be provided over a network 130 (e.g., the Internet, LAN, WAN, etc.). The term "user" as used herein may refer to an individual operating user devices 140, interacting with resources or exchanges using digital currencies (e.g., at a point-of-sale (POS) device, online marketplace, wallet-to-wallet) via the user devices 140. The user devices 140 may be used to send data to the provider system 110, central provider system 150, or additional provider systems 190, or may be used to access websites (e.g., using an internet browser), access applications (e.g., using a mobile application), and/or any other types of content. In some implementations, the user devices 140 have enabled location services which can be tracked over network 130.

For example, a user may be a payor (or payee) of a digital currency exchange and may have a digital currency wallet stored on the user device 140 such that a source address (or destination) of the digital currency wallet can be provided to the provider system 110 for initiation of an exchange. In another example, a user may be a college athletic program athlete that has one or more digital currency accounts (e.g., stored on provider ledger system 125) and may receive and/or use digital currency from the college athletic program based on one or more attributes (e.g., grading criteria, attendance requirements, store requirement (e.g., type, location, and so on), designated goods (e.g., only food, under certain price, and so on) facilitated by the provider system 110. In some arrangements, locations services may use GPS or other technologies to determine a location of user devices 140.

The user device 140 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, etc.). User device 140 may also include an input/output circuit 142 for communicating data over network 130 (e.g., receive and transmit environmental data and/or exchange data (e.g., requests, addresses, public and private key pairs)) to provider system 110, central provider system 150, and/or additional provider systems 190.

In some arrangements, the one or more user devices 140 can be configured to collect and provide environmental data. As used herein, "environmental data" may be any data collected in an environment of a user device 140. In particular, an environment can include, but is not limited to, network or virtual environment, physical or natural environment, or social environment. The user device 140 can use one or more input devices to collect and aggregate the environmental data into an environmental dataset. For example, network or virtual environment data can include, but is not limited to, IP addresses, MAC addresses, governmental data (e.g., FBI databases, CIA databases, COVID-19 databases, No Fly List databases, terrorist databases, vulnerability databases, and certificate databases), network packets, host name, network addresses, communication protocols, interactions with other networks or devices, historical exchange data, documents, agreements, smart contracts, ledger information, and so on. In another example, physical or natural environment data can include, but is not limited to, biometric data (e.g., biological data such as, fingerprint, iris/retina, hand geometry, facial geometry, DNA, and so on, and behavioral data such as, gait, gesture, keystroke dynamics, speech pattern, foot movement pattern, etc.), weather conditions, geographic locations (e.g., latitude and longitude, triangulation), and so on. In yet another example, social environment data can include, but is not limited to, social media data (e.g., Facebook, Twitter, Snapchat, and TikTok), news feed data (e.g., articles, breaking news, and television content), and so on.

The additional provider systems 190 may be configured to perform various actions and/or access various types of data, some of which may be provide over network 130. The term "additional provider" as used herein may refer to a provider with one or more individuals operating the additional provider systems 190 and interacting with resources or data via the additional provider systems 190. The additional provider systems 190 may be used to send data (e.g., exchange information) to the provider system 110, or may be used to provide an interface (e.g., via the additional provider interface 192) for exchanging digital currencies on a ledger network (e.g., inter-provider ledger system 194). The additional provider systems 190 can include one or more processors (e.g., any general purpose or special purpose processor), and include and/or be operably coupled to one or more transitory and/or non-transitory storage mediums and/or memory devices (e.g., any computer-readable storage media, such as a magnetic storage, optical storage, flash storage, RAM, and so on). In some arrangements, each additional provider system 190 can host an individual ledger (e.g., additional provider ledger system 196) specific to the provider. For example, provider A may host ledger J that has 2,250 digital asset accounts. In another example, provider B may host ledger K that has 5,000 digital asset accounts, where the fields associated with a digital asset (e.g., cryptocurrency) on ledger K may be different than the fields associated with a digital asset on ledger J.

The central provider system 150 (including similar features and functionalities as the additional provider systems 190) may be configured to perform various actions and/or access various types of data, some of which may be provide over network 130. The term "central provider" as used herein may refer to a federal reserve with one or more individuals operating the central provider system 150 and interacting with resources or data via the central provider system 150. The central provider system 150 may be used to send data (e.g., account information) to the provider system 110, or may be used to provide an interface (e.g., via the central interface 152) for exchanging digital currencies on a ledger network (e.g., central ledger system 154). The central provider systems 150 can include one or more processors (e.g., any general purpose or special purpose processor), and include and/or be operably coupled to one or more transitory and/or non-transitory storage mediums and/or memory devices (e.g., any computer-readable storage media, such as a magnetic storage, optical storage, flash storage, RAM, and so on). In some arrangements, the central provider system 150 can be configured to convert physical central bank notes into CBDC, and vice versa. In various arrangements, the central provider system 150 can interface (e.g., using central interface 152) with providers of the given country, state, or region to facilitate exchanges of digital assets such as CBDC into provider accounts, or vice versa. Additionally, the central provider system 150 may provide digital assets that can accrue interest.

The one or more data sources 160 may include data collected by the provider system 110, central provider system 150, and/or additional provider systems 190 by receiving exchange data (e.g., transactions, public keys, public and private key pairs, point-of-sale communications, wallet communications, ledger communications) from the plurality of devices and/or systems 110, 140, 150, 170, and/or 190. The data may be attributes for particular digital assets, or exchange information at one or more points in time. The data may be data for particular entities, third parties, or users (e.g., patients, customer transactions, internet ads, conditions, ledger addresses) at one or more points in time. The data collected may associated with a plurality of entities, a plurality of users, a plurality of providers, a specific entity, a specific user, a specific provider, and so on. Data sources 160 may also be various data aggregating systems and/or entities that collect environmental data. The provider system 110 can receive environmental data from the data sources 160 via the network 130. This information may be stored as environmental data in the provider database 120.

The one or more third-party devices 170 may be used by a third party with a relationship to a provider (e.g., vendor, customer, entity, supplier, and so on) to perform various actions and/or access various types of data, some of which may be provided over network 130. The term "third party" as used herein may refer to an individual operating one or more third-party devices 170, interacting with resources or data via the third-party devices 170. The third-party devices 170 may be used to electronically transmit data (e.g., exchange requests, attributes) to the provider system 110, to access websites (e.g., using a browser), the internet (e.g., using a mobile application), supply services, supply products, and to receive and/or transmit any other types of data. In some arrangements, third-party devices 170 can be configured to collect and provide environmental data to the provider system 110. In various arrangements, the third-party devices 170 may also be used to electronically transmit data to the user devices 140, central provider system 150, and additional provider systems 190, and can be configured to receive and/or transmit any other types of data. For example, a third party may be a payee of a digital currency exchange and may have a digital currency wallet stored on the third-party device 170 such that a destination address of the digital currency wallet can be provided to the provider system 110 for initiation of an exchange. In another example, a third party may be a college athletic program that has one or more digital currency accounts (e.g., stored on provider ledger system 125) and may provide one or more attributes (sometimes referred to herein as conditions) for one or more digital assets to the provider system 110.

The third-party device 170 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, etc.). Third-party device 170 may also include an input/output circuit 172 for communicating data over network 130 (e.g., receive and transmit environmental data and/or exchange data (e.g., requests, addresses, public and private key pairs)) to provider system 110, central provider system 150, and/or additional provider systems 190.

The input/output circuits (e.g., 142, 172) of user devices 140 and third-party devices 170 can be structured to send and receive communications over network 130 (e.g., with provider system 110). The input/output circuit is structured to exchange data (e.g., public and private key pairs, environmental data, attributes, and so on), communications, instructions, and so on, with an input/output component of the various systems and devices described herein. In one arrangement, the input/output circuit can include communication circuitry for facilitating the exchange of data, values, messages, and the like between the input/output circuit (e.g., 142, 172) and the provider system 110. In yet another arrangement, the input/output circuits can include machine-readable media for facilitating the exchange of information between the input/output circuits and the provider system 110. In yet another arrangement, the input/output circuits can include any combination of hardware components, communication circuitry, and machine-readable media.

In some arrangements, the input/output circuits of various devices and systems (e.g., 142, 172) describe herein can include suitable input/output ports and/or use an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuits may provide an interface for the user to interact with various applications and interfaces (e.g., exchange interface 112). For example, the input/output circuits of third-party devices 170 and/or user devices 140 include a keyboard, a keypad, a mouse, joystick, a touch screen, a microphone, a haptic sensor, a car sensor, an IoT sensor, a biometric sensor, an accelerometer sensor, a virtual reality headset, smart glasses, a smart headset, and the like. As another example, input/output circuits (e.g., 142, 172), may include, but is not limited to, a television monitor, a computer monitor, a printer, a facsimile machine, a speaker, and so on. As used herein, virtual reality, augmented reality, and mixed reality may each be used interchangeably yet refer to any kind of extended reality, including virtual reality, augmented reality, and mixed reality.

Additionally, the input/output circuits (e.g., 142, 172) can include, without limitation, input devices such as keyboards, touch screens, touchpads (e.g., electromagnetic induction pads, electrostatic pads, capacitive pads, etc.), microphones, joysticks, foot pedals, Inertial Measurement Units (IMUs), accelerometers, gyroscopes, tilt-sensors, motion sensors, environmental sensors, Musical Instrument Digital Interface (MIDI) input devices such as MIDI instruments (e.g., MIDI keyboards), styluses, pointing devices such as a mouse or trackball, and so on. Output devices can include, without limitation, video displays, speakers, haptic feedback devices, refreshable Braille terminals, lights, servos, and so on.

In various arrangements, input/output circuits (e.g., 142, 172) can transmit data periodically (e.g., environmental data). For example, input/output circuits may transmit data at a predefined time. As another example, input/output circuits may transmit data on an interval (e.g., every ten minutes, every ten hours, etc.). Additionally or alternatively, input/output circuits may transmit data in response to a threshold (e.g., within a certain geolocation, spent a specified amount of digital currency, when grades are posted by the university, when an appraisal comes back, and so on). For example, input/output circuits may transmit data in response to receiving an exchange request. In some arrangements, input/output circuits may transmit data dynamically. For example, input/output circuits may transmit data in response to user devices 140 being connected to a charging source or within a specific geolocation area. As a further example, input/output circuit may transmit data in response to requesting a digital currency exchange.

The computing environment 100 can include a data acquisition engine 180. In various arrangements, the provider system 110 can be communicatively and operatively coupled to the data acquisition engine 180. The data acquisition engine 180 can include one or more processing circuits configured to execute various instructions. In various arrangements, the data acquisition engine 180 can be configured to facilitate communication (e.g., via network 130) between the provider system 110, the provider database 120, the provider ledger system 125 and systems and devices described herein (e.g., user devices 140, central provider system 150, data sources 160, third-party devices 170). The facilitation of communication can be implemented as an application programming interface (API) (e.g., REST API, Web API, or customized API), batch files, SDK, and/or queries. In various arrangements, the data acquisition engine 180 can also be configured to control access to resources of the provider system 110, provider database 120, and provider ledger system 125.

One or more APIs can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of an SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

The provider system 110 may include one or more systems (e.g., computer-readable instructions executable by a processor) and/or circuits (e.g., ASICs, Processor Memory combinations, logic circuits, etc.) configured to perform various functions of the data protection system 110. In some arrangements, the systems may be or include an exchange interface 112 and an exchange system 114. It should be understood that various implementations may include more, fewer, or different systems than illustrated in FIG. 1, and all such modifications are contemplated within the scope of the present disclosure.

Referring to the interfaces described herein generally (e.g., 112, 152, and 192). Each interface can be configured to receive a plurality of data (e.g., environmental data, exchange data, central provider data, additional provider data, ledger data) from a plurality of data sources (e.g., provider database 120, provider ledger system 125, user devices 140, central provider system 150, central ledger system 154, data sources 160, third-party devices 170, additional provider systems 190, and inter-provider ledger system 194) via one or more data channels (e.g., over network 130). Each data channel may include a network connection (e.g., wired, wireless, cloud) between the data sources and the system (e.g., 110, 150, 190). The plurality of data can include, but is not limited to, environmental data (e.g., IP addresses, ledger information, smart contracts, and so on), central provider data (e.g., digital asset addresses on central digital asset ledger 158, public and/or private keys of the central key dataset 157, digital assets of central digital asset ledger 158, and so on), additional provider data (e.g., digital asset addresses on additional provider digital asset ledger 198, public and/or private keys of the additional provider key dataset 197, digital assets of additional provider digital asset ledger 198, and so on), and ledger data (e.g., digital asset addresses on provider digital asset ledger 128 and/or inter-provider digital asset ledger 193, public and/or private keys of the provider key dataset 127 and/or inter-provider key dataset 191, digital assets of provider digital asset ledger 128 and/or inter-provider digital asset ledger 193, and so on), and so on.

For example, the exchange interface 112 could receive central ledger data (e.g., stored on central ledger system 154) from the central provider system 150 including a digital asset and a public key (or public and private key pair) associated with a virtual US dollars (referred to hereafter as "VUSD") amount, a VUSD type (e.g., central provider, provider, inter-provider, additional provider, and so on), a trace identifier (referred to hereafter as trace_id, e.g., unique identifier), and a series (e.g., when the VUSD was generated). In particular, the digital asset may be a data package created and distributed by a central ledger (described below in detail with reference to central provider system 150). In the above example, the received central ledger data (e.g., digital currency) can be modified by the provider system 110 to include an assignee field and an attribute restricting the use of one or more functionalities of the digital asset, and remove the series field, while leaving the trace_id field unmodified. Alternatively, exchange system 114 may generate a new digital asset that mirrors the digital asset but also includes an assignee field and/or one or more attributes and in turn, the digital asset from the central ledger data may be destroyed. Upon destruction or amending the digital asset, the central provider system 150 may be notified (e.g., notification sent over network 130) that the digital asset received from the central ledger data has been transferred.

In another example, the additional provider interface 192 could receive inter-provider ledger data (e.g., stored on inter-provider ledger system 194) from the provider system 110 (via network 130), or directly from the inter-provider ledger system 194 (e.g., via a secure connection). The inter-provider ledger data could include unique fields (e.g., assignee, type) that could be modified by the additional provider interface 192 to comply with one or more standards of the additional provider. In various arrangements, the received inter-provider ledger data may have universal fields (e.g., standard) recognizable by all providers. For example, provider A may have unique fields (e.g., proprietary) and provider B may have unique fields for each digital asset on their individual ledgers. However, in the following example, if either provider A or provider B share a digital asset (e.g., format and transfer it on the inter-provider ledger system 194), the unique fields may be stripped out, such that only universal fields will be included in the digital asset. In some arrangements, some proprietary information of the provider in one or more digital assets may be added to the inter-provider ledger system 194, such that one or more different providers can utilize the proprietary information when making an exchange (e.g., SSN, birthday, provider-unique API calls, payment card industry (PCI) data, banking data, or personal identifiable information (PII), and so on). Accordingly, the inter-provider ledger system 194 may provide access (e.g., read, write, read/write) to a limited number of providers to improve security. For example, instead of using network 130, provider system 110 and additional provider system 190 may communicate (e.g., transmit, receive, collect, etc.) data with the inter-provider ledger system 194 using a private network with dedicated lines to each provider (e.g., 110, 190). In various arrangements, the private network may be implemented based on a private network protocol such as Internet Protocol Security (IPSec), Layer 2 Tunneling Protocol (L2TP), Point-to-Point Tunneling Protocol (PPTP), Secure Shell (SSH), and so on. In some arrangements, each dedicated line may provide each provider (e.g., 110, 190) a private IPV4 address and a private IPV6 address.

In various arrangements, if proprietary information is transferred to the inter-provider ledger system 194, an additional field may be applied (or added) to the digital asset (e.g., secure field) such that whenever a digital asset includes a secure field, any transfer of such digital asset may be required to be encrypted and/or occur over a secure connection. In particular, one or more systems described herein (e.g., additional provider systems 190, provider system 110) can establish a secure connection with the inter-prover ledger system 194 during transferring or receiving a digital asset stored on digital asset ledger 193. In some arrangements, a secure connection can be established between two systems or devices (e.g., 190 and 194, 110 and 194, 110 and 190, 110 and 150, and so on) such that any communications (e.g., data transfers) are encrypted before being sent and then decrypted upon receipt. Additionally, all communications over a secure connection can be encrypted with one or more secure network protocols (e.g., Secure Shell (SSL), Kerberos, IPSec, Secure Sockets Layer (SSL), Hypertext Transfer Protocol Secure (HTTPS), and so on) implemented utilizing a cryptographic function (e.g., symmetric encryption, asymmetric encryption, hashing, and so on). For example, the cryptographic function could be a homomorphic encryption function. In other examples, the cryptographic function could be any symmetric encryption function (e.g., Triple Data Encryption Standard (TDES), RC5, Advanced Encryption Standard (AES), Blowfish, CAST, and so on), and/or asymmetric encryption function (e.g. Rivest-Shamir-Adleman (RSA), Efficient and Compact Subgroup Trace Representation (ECSTR or XTR), Digital Secure, Escrowed Encryption Standard (EES), and so on).

In yet another example, the central interface 152 could receive provider ledger data (e.g., stored on provider ledger system 125) from the provider system 110 (via network 130) including a digital asset and a public key (or public and private key pair) associated with a virtual US dollars (referred to hereafter as "VUSD") amount, a VUSD type (e.g., central provider, provider, inter-provider, additional provider, and so on), a trace identifier (trace_id, e.g., unique identifier), and a series (e.g., when the VUSD was generated). In the above example, the received provider ledger data (e.g., digital currency) can be modified by the central provider system 150 to remove one or more unique fields (e.g., assignee) added to the digital asset by the provider ledger system 125. In the following example, the central interface 152 can use the public key to verify the digital asset, generate a new public and private key pair, and store the digital asset in a central digital asset ledger 158. Alternatively, the VUSD amount may be used to update an amount associated with a digital asset already stored on the central digital asset ledger 158 and in turn, the digital asset from the provider ledger data may be destroyed. Upon destruction or amending the digital asset, the provider system 110 may be notified (e.g., notification sent over network 130) that the digital asset received from the provider ledger data has been transferred.

Furthermore, in general, each interface can be configured to receive requests (e.g., exchange requests, wrapping requests) from a plurality of systems (e.g., provider ledger system 125, user devices 140, central provider system 150, central ledger system 154, data sources 160, third-party devices 170, additional provider systems 190, and inter-provider ledger system 194) via one or more data channels (e.g., over network 130). Each data channel may include a network connection (e.g., wired, wireless, cloud) between the data sources and the system (e.g., 110, 150, 190). The requests can be to update (e.g., such as update a field) and amend (e.g., such as execute an exchange) a digital asset ledger (e.g., 128, 158, 193, and 198). In some arrangements, the interfaces (e.g., 112, 152, and 192) can utilize a private ledger (e.g., centralized) that can be managed by each interface and can limit access to updating and modifying the private ledger.

For example, upon receiving a request for issuance (e.g., execute an exchange from the central digital asset ledger 158 to the provider digital asset ledger 128) the central interface 152 can cross-reference the central key dataset 157 to identify public keys and private keys associated with one or more digital assets to exchange on the central digital asset ledger 158. Moreover, the central interface 152 upon identifying public keys of one or more digital assets, can sign the one or more digital assets using one or more identified private keys and transmit the one or more digital assets with a public key (sometimes referred to herein as a "central public key") to the provider system 110 (e.g., in particular exchange interface 112). In particular, signing using the private key can include hashing (e.g., SHA1, MD5, etc.) the digital asset and verifying using the public key can include decrypting the digital asset using the public key to verify the digital signature came from the particular private key. In some arrangements, the keys may be symmetric (e.g., use the same key to sign/verify) or asymmetric (e.g., use different keys to sign/verify). For example, an algorithm (e.g., such as a hash algorithm) can be applied to a private key to generate a public key. Accordingly, public keys can be a cryptographic code that allows users and system described herein to receive digital assets and verify them prior to amending and/or updating a ledger (e.g., 128, 158, 193, 198).

In some arrangements, the data channels can be between a source address on a source ledger and a destination address on a destination ledger, such that receivals or transmissions of a digital asset occur between the addresses on the ledgers. An address can be generated based on executing, by the exchange system 114, a math-based function (e.g., hash, symmetric encryption, asymmetric encryption) on a public key of a public and private key pair (or a verification key of a verification and signing key pair). For example, if an exchange interface 112 receives ledger data from any system described herein, the ledger data may be associated with a source address, and the exchange interface 112 may determine a destination address (e.g., may be provided to the system sending the ledger data in advance) to store the ledger data in the provider digital asset ledger 128. In yet another example, if the central interface 152 receives ledger data from any system described herein, the ledger data may be associated with a source address, and the central interface 152 may determine a destination address (e.g., may be provided to the system sending the ledger data in advance) to store the ledger data in the central digital asset ledger 158. In various arrangements, the addresses may be a unique sequence of randomized (or pseudo-randomized) numerical digits, characters, punctuation, whitespace, code (e.g., QR), or symbols.

The interfaces (e.g., 112, 152, 192) can also be configured to generate public and private key pairs and provide public keys (e.g., or public and private key pairs) to one or more computing devices (e.g., provider system 110, user devices 140, central provider system 150, third-party devices 170, and/or additional provider systems 190) for use in a digital asset exchange. That is, the exchange interface 112 can interface (e.g., using an API) with one or more ledger systems (e.g., 125, 154, 194, 196), and/or one or more devices (e.g., user devices 140, and third-party devices 170). In various arrangements, the public and private key pair can be generated based on a cryptographic function (e.g., symmetric-key algorithms (such as DES, AES), asymmetric-key algorithms (Ed25519 signing, ECC), public-key algorithms (such as RSA), and so on) and be stored in the respective key datasets (e.g., 127, 157, 191, 197). In some arrangements, each ledger system (e.g., 125, 154, 194, 196) can maintain (e.g., store and access keys) a key dataset such that each digital asset may be associated with a public/private key pair stored on the key dataset. Each public/private key pair can shared amongst a plurality of digital assets or can be unique to each digital asset on the ledger.

In various arrangements, the sender (e.g., a source party such as a user, provider, or entity) can utilize its private key to generate a digital signature. The process of signing the message uses a mathematical operation that can only be performed by the device (e.g., 140, 170) of the sender who possesses the private key. The digital asset and the digital signature can then be sent to a recipient. As will be appreciated, the recipient (e.g., destination party) can be a user, provider, and/or entity that can use the digital signature and the sender's public key to verify that the sender is the signer of the digital asset and that the integrity and origin authenticity of the digital asset has not been compromised. In some arrangements, one or more digital assets on a ledger (e.g., 128, 158, 193, 198) may be associated with an account (e.g., designated in a field such as an account_ID field). In one example, the central provider system 150 may receive a deposit of digital assets from the provider system 110, and the provider system 110 may have an account with the central provider system 150. In the following example, the central provider system 150 may deposit digital assets (e.g., after verifying the digital signature) on the central digital asset ledger 158 associated with the account of the provider system 110. In this example, the central provider system 150 may notify (e.g., send a message) to the provider system 110 that a deposit was successful. Further in this example, the provider system 110 may in turn destroy or update the provider digital asset ledger based on the successful deposit message. In some arrangements, if when the digital assets are transferred between ledgers the digital asset on the senders ledger may be voided since the public/private key pair would be invalid (e.g., cannot be used to sign or verify an exchange). That is, while the ledgers may not destroy or update the digital assets when they are transferred to different ledgers the digital asset on the senders ledger would be unusable or unvalued.

The exchange interface 112 (and other interfaces described herein 152, 192) can be configured to generate various data structures stored in the provider ledger system 125, provider database 120, and inter-provider ledger system 194 (or the interface's respective connected systems). For example, the exchange interface 112 can be configured to generate one or more digital assets (e.g., digital currencies). The digital asset may be a data structure including one or more fields and can be stored on the provider digital asset ledger 125 and/or inter-provider digital asset ledger 193. In generating a digital asset, a public and private key pair can be generated that can be unique to the digital asset. The exchange interface 112 can store the generated public and private key pairs in the provider key dataset 127 and/or inter-provider key dataset 191.

The exchange interface 112 (and other interfaces described herein 152, 192) can also be configured to receive data that can be used in performing exchanges and/or updating digital assets. For example, exchange interface 112 can be configured to receive environmental data from one or more systems and/or device described herein. In the following example, the received environmental data may be analyzed to determine if one or more attributes (or conditions) of a smart contract stored in one or more digital assets on the provider digital asset ledger 128 have been satisfied.

The exchange interface 112 can further be configured to retrieve and analyze environmental data from the systems and devices described herein, including actions performed by user devices 140, over third-party devices 170, over network 130. In some implementations, exchange interface 112 retrieves user activity data and creates an environmental activity log with one or more log entries. The environmental activity log can span over any specified time period (e.g., past month, past week, etc.) and can be specific to users based on any constraints (e.g., business in California, users in Texas, associated VUSD, and so on). The exchange interface 112 may be configured to use a filtered environmental activity log in order to determine if one or more attributes occurred associated with one or more smart contracts stored on digital assets of the provider digital asset ledger 128.

The exchange interface 112 and/or exchange system 114 can also be configured to query the provider database 120, provider ledger system 125, and/or inter-provider ledger system 194. In various arrangements, the provider database 120 includes various transitory and/or non-transitory storage media. The storage media may include magnetic storage, optical storage, flash storage, and RAM. The provider database 120 and/or the provider system 110 can use various APIs to perform database functions (e.g., managing data stored in the provider database 120). The APIs can include SQL, NoSQL, NewSQL, ODBC, and/or JDBC components.

The exchange interface 112 and/or exchange system 114 can retrieve data stored in the provider database 120 that can be utilized to select a template (e.g., stored in template dataset 122) and populate a plurality of fields based on received environmental data. The data stored in the provider database 120 could include template information (e.g., in the template dataset 122) associated with a plurality of templates that can selected and populated when performing a digital currency exchange to multiple parties (e.g., multiple destination addresses). Further, the data stored in the provider database 120 may include personal information (e.g., names, addresses, phone numbers, and so on), authentication information (e.g., username/password combinations, device authentication tokens, security question answers, unique client identifiers, biometric data, geographic data, social media data, and so on), and financial information (e.g., token information, account numbers, account balances, available credit, credit history, exchange histories, and so on) relating to the various users and associated provider accounts. In some arrangements, the provider database 120 may include a subset of databases such that the exchange interface 112 and/or exchange system 114 can analyze each database to determine the appropriate information needed to select and populate a template.

The template dataset 122 can include subsets of data that each include templates for one or more types of exchanges (e.g., commercial, person-to-person, state of exchange, and so on). The subsets of data (e.g., provided by data sources 160) may include, but are not limited to, tax data (e.g., taxes for municipality, tax deductions, sales tax, state taxes, federal taxes), insurance data (e.g., current policy premium), fee data (e.g., cleaning fees for rentals, processing fees for mortgage applications, student fees), expense data (e.g., expenses associated with service providers of the entity and/or users, software licensing expenses, utility expenses, rent expenses), allocation data (e.g., direct deposit allocation, percentage of monies allocated to a particular bank account), and so on. Accordingly, the subsets of data can be used by the exchange interface 112 and/or exchange system 114 to generate one or more templates (e.g., stored in template dataset 122). In some arrangements, the templates can be generated in real-time based on received exchange request, or templates may be generated and stored for a future time when an exchange request is received.

Referring to the ledger systems (sometimes referred to herein as "ledger networks") described herein generally (e.g., 125, 154, 194, 196). Each ledger system (or network) can include a key dataset (e.g., 127, 157, 191, 197) and a digital asset ledger (e.g., 128, 158, 193, and 198). Each ledger system can be configured to store and/or maintain any of the information described herein (e.g., digital assets, smart contracts, public and private key pairs, etc.). In some arrangements, the described ledger systems and methods involve utilizing one or more processing circuits. The one or more processing circuits allow receiving, collecting, and sending of environmental data, exchange requests, public and private key pairs, attributes, smart contracts, and so on. The one or more processing circuits can then communicate with one or more nodes of the digital asset ledgers (e.g., 128, 158, 193, and 198) and execute one or more smart contracts stored on the nodes to perform various checks (e.g., signing, verifying, distributing).

In various arrangements, the key datasets (e.g., 127, 157, 191, 197) can include a plurality of public and private key pairs (referred to hereafter as "key pairs"). In some arrangements, the ledger systems can include a hardware security module (HSM) that can manage cryptographic keys. Each key pair can be stored (e.g., by interfaces 112, 152, and 192) in the key dataset utilizing a cryptographic function. For example, the cryptographic function could be a homomorphic encryption function. In another example, the cryptographic function could be any symmetric encryption function (e.g., Triple Data Encryption Standard (TDES), RC5, Advanced Encryption Standard (AES), Blowfish, CAST, and so on), and/or asymmetric encryption function (e.g. Rivest-Shamir-Adleman (RSA), Efficient and Compact Subgroup Trace Representation (ECSTR or XTR), Digital Secure, Escrowed Encryption Standard (EES), and so on). In some arrangements, the private key can be used to encrypt digital assets (e.g., using a cryptographic function) at the source system (e.g., provider ledger system 125, central ledger system 154, and so on) when an exchange occurs (e.g., send digital asset from a source address to a destination address). In various arrangements, the public key can be used by the destination system (e.g., user devices 140, third-party devices 170, additional provider systems 190) to decrypt the encrypted digital asset.

In some arrangements, the digital asset ledgers (e.g., 128, 158, 193, 198) can include a plurality of nodes configured to store a copy of one or more digital assets. In various arrangements, each node may contain a copy of an individual digital assets associated with an account of a provider. Each individual asset may have one or more fields such as, but not limited to, trace_ID, account_ID, one or more attributes, VUSD_amount, assignee, subtype, type, and so on. Additional details and examples relating to arrangements of digital assets on the digital asset ledgers are described in detail with reference to FIGS. 6-7.

In various arrangements, the plurality of nodes on the digital asset ledgers (e.g., 128, 158, 193, 198) can be interconnected via a central node (e.g., centralized or generalized). Indeed, each node can perform various operations (e.g., execute smart contracts, update digital assets) on the digital asset ledger. Thus, the central node can operate as an intermediary between any system or device with data not stored on the ledger such that, any communications (e.g., exchange requests, wrapping requests, template selection, public and private key access) first is received by the central node. As such, the central node may be configured to route communications and/or query one or more nodes on the digital asset ledger upon receiving a communication from any system or device described herein. In some arrangements, the central node may be a digital asset and may be the root node (e.g., the originally created digital asset), and any additional nodes added may be attached (e.g., appended, pre-pended, linked, associated, embedded) to the central node via one or more communications networks (e.g., public, private, shared, and so on). In various arrangements, the central node may be a dummy asset that stores data (e.g., addresses, trace IDs) to communicate with the other nodes on the digital asset ledger 128.

For example, each node (e.g., other than the central node) on the provider digital asset ledger 128 may contain one or more digital assets associated with an amount of VUSD and have one or more unique fields (e.g., attribute, assignee, subtype, account_ID, and so on) and one or more universal fields (e.g., trace_ID, VUSD_amount, type). In another example, each node on the central digital asset ledger 158 may contain a plurality of digital assets associated with a particular provider (e.g., bank A, bank B, bank C). In yet another example, each node on the inter-provider digital asset ledger 193 may contain a digital asset universally accepted across providers such that each provider may not have to remove any fields unique (or propriety) to other providers when an exchange request is received, signed, and verified. In yet another example, each node on the additional provider digital asset ledger 198 may contain a digital asset with one or more fields unique (or propriety) to the additional provider.

Alternatively, the plurality of nodes on the digital asset ledgers could be interconnected with the plurality of nodes to form a peer-to-peer network (e.g., distributed ledger network). In the following arrangement, instead of a central node operating as an intermediary, each node may contain a copy of a plurality of digital assets associated with the one or more providers and can operate as an individual intermediary which may contain a copy of a plurality of digital assets associated with the one or more providers. Additionally, each node could be configured to determine functions to perform (e.g., execute a smart contract, send public key, modify assignee, update fields) based on communications. While various circuits, interfaces, and logic with particular functionality are shown, it should be understood that the digital asset ledgers can include any number of circuits, interfaces, and logic for facilitating the functions described herein. For example, the activities of multiple circuits may be combined as a single circuit and implemented on a single processing circuit, as additional circuits with additional functionality are included.

The exchange system 114 can be configured to process exchanges of digital assets (e.g., digital currency) and may be configured to perform various actions and/or access various types of data, some of which may be provide over network 130. In particular, the exchange system 114 can be configured to process digital currency exchanges based on received public keys (or public and private key pairs), environmental data, templates, and one or more fields of one or more digital assets stored on a ledger network (e.g., 128, 158, 193, 198) from the systems and devices described herein. Additional details and examples relating to exchange digital currency are described in detail with reference to FIGS. 2-7.

In some arrangements, exchanges of digital assets on a ledger network (e.g., 128, 158, 192, and 198) include utilizing smart contracts (e.g., virtual contracts/agreements). As used herein, the phrase "smart contract" generally refers to a self-executing code (e.g., in a ledger network or other system) that executes when a set of conditions that have been agreed upon by the parties of the smart contract are met. Although the FIGS. and specification generally discuss utilizing smart contracts on exchanges, the systems, methods, and apparatuses disclosed herein can also be used for a plurality of types of financial services, such as but not limited to deeds, leases, wills, non-smart contracts, traditional legal contracts, financial disbursements, taxes, and other types of agreements between one or more parties. Parties to the smart contract or other types of agreements may be individuals, companies, organizations, entities, providers, and so on.

In various arrangements, when attributes restricting one or more functionalities of a digital asset are received, the exchange system 114 may generate a smart contract and wrap the digital asset (e.g., using the private key, stored in provider key dataset 127, to modify the digital asset) stored on the provider ledger system 125, in particular provider digital asset ledger 128, to include the attribute. For example, a parent may assign digital asset A to their child but only allow it to be used at grocery store B. In the following example, the exchange system 114 could update the assignee field of digital asset A, stored on provider digital asset ledger 128, to include the child (and sometimes removing the parent) and generate a smart contract (e.g., smart contract #1) such that smart contract is wrapped into digital asset A. Thus, whenever the child attempts to make an exchange at grocery store B, the provider ledger system 125 must verify the smart contract attribute (e.g., if the exchange is occurring at grocery store B, then allow the transaction) before allowing the digital asset to be used. In another example, if the exchange does not occur at grocery store B but instead at grocery store C, the exchange would be denied by provider ledger system 125.

Accordingly, when an exchange request is received (e.g., by the exchange interface 112), the exchange system 114 may communicate a command to the provider ledger system 125 to execute a smart contract, and as a result update the provider digital asset ledger 128 if the attribute is satisfied. In various arrangements, each command can include program code (e.g., a script, an executable) that, when executed by a ledger network (e.g., 128, 158, 193, 198) of a ledger system (e.g., 125, 154, 194, 196), causes the smart contract to execute a specific set of instructions. Updating the provider digital asset ledger 128 can include utilizing a public key or private key for a particular asset. For example, to wrap a provider ledger system 125 can "unlock" the digital asset utilizing the public or private key stored in the provider key dataset 127 and add one or more attributes. In the following example, the digital asset can be "locked" by the provider ledger system 125 based on generating a new private key (or public and private key pair). In another example, the digital asset could be "locked" by the provider ledger system 125 based on the previously used public or private key.

Figure 2:
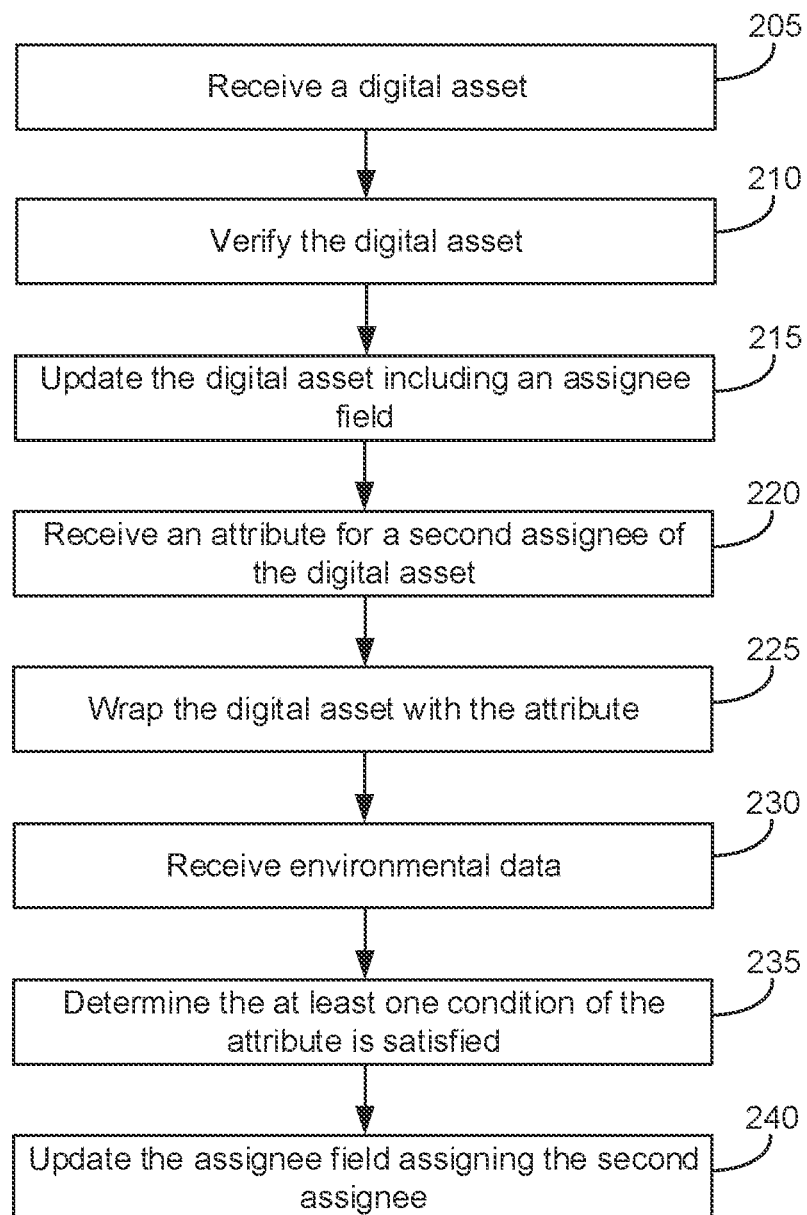
FIG. 2 is a flowchart for a method of wrapping digital assets, according to some arrangements.

Referring now to FIG. 2, a flowchart for a method 200 of wrapping digital assets is shown, according to some arrangements. Provider system 110 can be configured to perform method 200. Further, any computing device described herein can be configured to perform method 200.

In broad overview of method 200, at block 205, the one or more processing circuits (e.g., provider system 110 in FIG. 1) can receive a digital asset. At block 210, the one or more processing circuits can verify the digital asset. At block 215, one or more processing circuits can update the digital asset including an assignee field. At block 220, the one or more processing circuits can receive an attribute for a second assignee of the digital asset. At block 225, the one or more processing circuits can wrap the digital asset with the attribute. At block 230, the one or more processing circuits can receive environmental data. At block 235, the one or more processing circuits can determine the at least one condition of the attribute is satisfied. At block 240, the one or more processing circuits can update the assignee field assigning the second assignee. Additional, fewer, or different operations may be performed depending on the particular arrangement. In some arrangements, some or all operations of method 200 may be performed by one or more processors executing on one or more computing devices, systems, or servers. In various arrangements, each operation may be re-ordered, added, removed, or repeated.

Referring to method 200 in more detail, at block 205, the one or more processing circuits (e.g., provider system 110 in FIG. 1) can receive, from a central provider system via the network 130, a digital asset signed by a central private key associated with the digital asset on a central ledger. The signed digital asset can be signed by the central provider system (e.g., 150) using the central private key and the digital asset (e.g., digital currency). In some arrangements, the signed digital asset can be unique to each digital asset, such that if a different digital asset is signed (e.g., associated with a different amount of digital currency or a different user/account) it can produce a different signed digital asset. In various arrangements, before the digital asset is signed, one or more processing circuits may execute a cryptographic hash function (CHF) (e.g., SHA-256, SHA-1, SHA-2, SHA-3, MD5, Curl, RIPEMD-160, Whirlpool, BLAKE2, BLAKE3) on the digital asset, to receive a hashed digital asset (sometimes referred to as a digest of the cryptographic hash function). Accordingly, the hashed digital asset and the central private key can be used to generate a signed digital asset.

For example, a central bank (e.g., central provider system 150) may contain an amount of (e.g., 1.2 trillion) digital assets (e.g., CBDC), such that each digital asset is equivalent to $1 USD and pegged to the value of the USD. In the following example, a provider may request issuance of 5 million digital assets (e.g., when digital assets are below a threshold level, when a large exchange is requested by a customer of the provider, when a provider exchanges USD for digital assets). Accordingly, when the central bank receives the request, the central bank may sign each of the 5 million digital assets and provide the signed digital assets to the provider. Alternatively, the central bank may package the 5 million digital assets into a single digital asset based on creating a new digital asset with a new public and private key pair and new fields (e.g., trace_ID, series, and so on) including at least the new value of 5 million.

In another example, a central bank (e.g., central provider system 150) may contain digital assets (e.g., digital currency reserves pegged to the value of the USD) for each provider it issues digital currency to and a central digital asset with any unallocated currency (or unissued digital currency), such that each provider may have (or be required to have) a certain amount (or reserve amount) of digital currency stored on a central digital asset ledger (e.g., 158) of the central bank. A provider may also have an internal ledger (e.g., 128) that includes a plurality of digital assets pegged to the value of the USD but not stored in the central bank. In the following example, the provider may request a transfer (from the digital asset associated with the provider stored on central digital asset ledger) or issuance (from the central digital asset) of 1 billion digital currency to the internal ledger, such that the provider can issue and process exchanges using digital assets. Accordingly, when the central bank receives the request, the central bank may create a digital asset or split a digital asset (e.g., the reserve balance which is restored on the central ledger, and the issuance balance which is issued to the provider) and sign the digital asset associated with 1 billion digital currency and provide the signed digital assets to the provider.

In one arrangement, the digital asset can be a CBDC issued by the central ledger (e.g., 158), where the CBDC is a digital form of a fiat currency of one or more nations, one or more countries, or one or more regions. In another arrangements, the digital asset can be a token derived from a CBDC issued by the central ledger, wherein the token is a digital form of a fiat currency of one or more nations, one or more countries, or one or more regions. A tokenized CBDC can be referred to herein as the process of substituting digital currency with a non-value equivalent, referred to as a token, that can have no extrinsic or exploitable meaning or value. The token can be a reference that maps back to the digital currency through the central interface (e.g., 152). For example, the digital currency (e.g., digital asset) could be $500 VUSD with one or more fields (e.g., [trace_ID: TS56NJKOB; Series: 2050A; Type: Central Provider Digital Asset; VUSD_Amount: 500]), but the one or more processing circuits could substitute the digital asset with a random set of numbers (e.g., 4289348879432902) such that the tokenized digital asset (e.g., random set of numbers) can be sent to the one or more processing circuits.

In general, the one or more processing circuits can communicate with ledgers (e.g., receive digital assets, send digital assets) via the addresses (public or private) of the source and destination ledgers (or digital wallets). Each address may be a unique sequence of randomized (or pseudo-randomized) numerical digits, characters, punctuation, whitespace, code (e.g., QR) or symbols. For example, an address may be a randomized 256-bit sequence. An address can be associated with one or more digital assets (e.g., digital currency balances). In some arrangements, addresses may be shared across network 130. In various arrangements, the exchange interfaces (e.g., 112, 152, and 192) may be allowed to access address information of various ledgers including, but not limited to, provider digital asset ledger 128 addresses, inter-provider digital asset ledger 193 addresses, additional provider digital asset ledger 198 addresses, and central digital asset ledger 158 addresses. For example, the exchange interface 112 of the one or more processing circuits can establish a secure connection over a secure network. That is, the secure connection can allow for secure communication and secure transfer of data to/from the one or more processing circuits over a secure network (e.g., secure VPN connection, secure wired connection, and so on) utilizing a secure network protocol (e.g., Secure Shell (SSL), Kerberos, IPSec, Secure Sockets Layer (SSL), Hypertext Transfer Protocol Secure (HTTPS), and so on).

In various arrangements, any data shared and/or accessed over network 130 may be encrypted and/or secured (e.g., hashed, password protected) to prevent unauthorized parties from performing unauthorized actions in the computer network environment. For example, a masking algorithm may be executed performing bitwise operations (e.g., NOT, AND, NAND, OR, XOR, Complement, left-shift (logical or arithmetic), right-shift (logical or arithmetic), rotate right, rotate left, and so on) on the addresses, digital assets, or any data transferred over network 130.

At block 210, the one or more processing circuits can verify the digital asset based on a central public key. In some arrangements, the signed digital asset and the digital asset may also be used in verifying the digital asset. For example, using an RSA encryption, the digital asset can be encrypted and/or hashed by the central provider (e.g., 150) such that the digital asset can be considered signed. The one or more processing circuits can (1) calculate a hash of the digital asset, and (2) decrypt the digital asset using the public key to produce a hash. If the two hashes are identical the one or more processing circuits can verify the digital asset was signed by the central provider and that it was not changed or tampered with. Alternatively, if the two hashes does not match, the digital asset is not the same digital asset sent by the central provider (e.g., it was changed or tampered with). In various arrangements, instead of using RSA encryption, the digital assets can signed and verified using AES encryption, SHA encryption, DES encryption, and so on.

In some arrangements, verifying can also include using a two-factor authentication. For example, the one or more processing circuits can send a notification to the central bank to confirm the digital asset is valid and associated with the central digital asset ledger (e.g., 158). In various arrangements, based on the digital asset or preferences of a user, the digital asset may be verified at a later point in time or block 210 can be skipped. In some arrangements, verifying can also include updated or appending a digital asset ledger (e.g., 128) to include the new digital asset. Updating or appending can include generating a new public and private key pair for the digital asset and storing the key pair in the key database (e.g., 127). Alternatively, unused public and private key pairs may be stored in the provider key dataset 127 such that when the digital asset ledger is updated or appended with the new digital asset, the one or more processing circuits can select an unused public and private key pair in the provider key dataset 127 such that it is now assigned (or used) by the new digital asset.

In some arrangements, verifying can further include communicating with other systems (e.g., ledgers) to notify the ledger that the digital asset was verified (e.g., transferred and stored on a different ledger). For example, the central provider system 150 may provide a signed digital asset to the one or more processing circuits. In the following example, the one or more processing circuits (e.g., 110) can receive the digital asset and perform verification. Upon verifying, the one or more processing circuits 150 may notify (e.g., send a message) the central provider system 150 that a digital asset (or a plurality of digital assets) was verified. Further in this example, the central provider system 150 may in turn destroy or update the central digital asset ledger 158 based on the successful verification. In some arrangements, if when the digital assets are transferred between ledgers the digital asset on the senders ledger may be voided since the public/private key pair would be invalid (e.g., cannot be used to sign or verify an exchange). That is, while the ledgers may not destroy or update the digital assets when they are transferred to different ledgers the digital asset on the senders ledger would be unusable or unvalued.

At block 215, the one or more processing circuits can update the digital asset including an assignee field, where the assignee field includes the first assignee. As described above, a digital asset may have a plurality of fields that can be modifiable (e.g., added, removed, or updated). In some arrangements, the digital asset can be updated to add an assignee field, such that the data structure of the digital asset includes the previous data (e.g., trace_ID, type (e.g., CBDC linked to USD, CBDC linked to Euro), VUSD_amount, and so on), as well as additional data, such as the assignee field. Additionally, the digital asset fields can be updated by the one or more processing circuits to conform with the ledger (e.g., 128, 158, 198, 193) associated with the one or more processing circuits. That is, each digital asset stored on the ledger of the one or more processing circuits may include one or more standard fields associated with the provider. For example, a sub_type field may be added (from the received digital asset of the central provider system) indicating the business (e.g., home loan, credit card, car loan, investing, checking, savings) of the provider the digital asset is associated with. In another example, an account_ID field may be added to indicate the account of the assignee with the provider. Accordingly, each ledger may have a unique standardized asset, such that each digital asset on a particular ledger may have the same fields, but digital assets on different ledgers may have additional or fewer fields. In some arrangements, the particular ledger may have multiple sub-ledgers associated with types or sub-types of digital assets. That is, each sub-ledger may have the same fields, but the digital assets on different sub-ledgers may have additional or fewer fields. For example, one sub-ledger may include all digital assets associated with a loan (e.g., sub-type). In another example, one sub-ledger may include all digital assets linked to the USD. As shown, one or more sub-ledgers may include the same digital assets but with additional or fewer fields.

At block 220, the one or more processing circuits can receive, from a first user device associated with the first assignee, an attribute for a second assignee of the digital asset, wherein the attribute includes at least one condition that restricts one or more functionalities of the digital asset. The first user device may be associated with an employee of the first assignee with administrative access. In some arrangements, the attribute can include conditions that can restrict functionalities (e.g., uses) of the digital asset and one or more additional actions to execute if the conditions have been satisfied (e.g., update assignee field). The conditions can include, but are not limited to, spending parameters (e.g., spending limits, expiration, per exchange limit, amount, and so on), geolocation parameters (e.g., digital asset must be used in certain location or area), environmental parameters (e.g., exchange must be from a renewable resource (e.g., exchange for electricity used by an electric car), exchange can only occur when the temperature drops below 30 (e.g., to purchase a snow shovel)), and so on), exchange type parameters (e.g., online, wire, automated clearing house (ACH), mobile, and so on), good or service type parameters (e.g., food, utilities, rent, school supplies, and so on), and so on.

In some arrangements, functionalities can include, but are not limited to, using the digital asset in an exchange (e.g., for a good or service), using the digital asset as a loan, using the digital asset a rewards card or coupon, using the digital asset as an immutable record (e.g., on a ledger), using the digital asset to execute smart contracts, using the digital asset for digital identification, using the digital asset for voting, using the digital asset for title transfers, using the digital asset for tax compliance, using the digital asset as a wills, using the digital asset for prescription drug tracking. Accordingly, the functionalities such as exchanges, loans, rewards card or coupon, immutable records, execution of smart contracts, digital identification, voting, title transfers, tax compliance, wills, prescription drug tracking, and so on, can be restricted based on the conditions set by the first assignee. For example, the assignee of a digital asset with trace_ID: 84KFJEN %3, Series: 2032D, Type: Loan Asset, VUSD_Amount: 520,000 may desire to restrict a loan disbursement (e.g., functionality) based on the borrower submitting required documents and providing sufficient funds. In the following example, once the loan disbursement conditions of the attribute are satisfied the loan can be disbursed and the assignee may be modified. In another example, the assignee of a digital asset with trace_ID: 84KFJEN %3, Series: 2032D, Type: Loan Asset, VUSD_Amount: 520,000 may desire to restrict a scholarship disbursement (e.g., functionality) based on the athlete meeting a certain grade threshold (e.g., B or better). In the following example, once the certain grade threshold is satisfied the scholarship can be disbursed and the assignee may be modified.

At block 225, the one or more processing circuits can wrap, utilizing the private key of the public and private key pair, the digital asset with the attribute. In some arrangements, a wrapper can be generated based on the attribute, and where the wrapper (e.g., data structure) can be stored as at least one of a smart contract, or in a block on an internal ledger (e.g., 128, 158, 193, 198). In some arrangements, prior to wrapping the digital asset, the one or more processing circuits can provide the attribute received from the first assignee to a second user device (e.g., 140) associated with a second assignee. In turn, the one or more processing circuits can receive an indicated the attributed was accepted. Accordingly, the attribute can form a contract-like agreement between the first assignee and second assignee such that one or more obligations (e.g., conditions) are created and enforceable by the provider system 110. In some arrangements, the one or more processing circuits can transmit, to a second user device associated with the second assignee, a notification including the attribute and identifying the at least one condition that restricts the one or more functionalities of the digital asset. That is, a smart contract can include code executable (e.g., wrapper executable code) by the second user device that wraps a digital asset to include attributes (e.g., additional or new).

Accordingly, the one or more processing circuit can generate executable code to perform one or more functions associated with the attributed. Generating executable code can include querying code libraries. frameworks, and/or engines stored in provider database 120 and/or data sources 160 and determining one or more functions and/or logic based on the attribute. In general, generating executable code can include using a code generator by converting a representation of one or more actions (e.g., attributes) into a form that can readily executed by a machine (e.g., processing circuits described herein). In general, the executable code can be a "mini-program" resembling an agreement rendered as code and can function on if-then basis (or other conditional logic statements such if-else, if-then-else-then, etc.). As such, when predefined criteria (e.g., attributes) are met, the executable code can initiate an action (e.g., change an assignee field, initiate additional executable code, modify the value). In some arrangements, more than one wrapper can be generated that can be cascaded and/or paralleled such that a plurality of actions are performed utilizing a cascade approach (e.g., execute a plurality of executable code one after another), or parallel approach (e.g., execute a plurality of executable code at the same time).

At block 230, the one or more processing circuits can receive environmental data associated with the attribute. Environmental data can be data collected and generated by one or more devices and/or systems in computer environment 100. As described above, an environment can include, but is not limited to, network or virtual environment, physical or natural environment, or social environment. The one or more devices and/or systems described herein can use one or more input devices to collect and aggregate the environmental data into an environmental dataset. For example, network or virtual environment data can include, but is not limited to, IP addresses, MAC addresses, governmental data (e.g., FBI databases, CIA databases, COVID-19 databases, No Fly List databases, terrorist databases, vulnerability databases, and certificate databases), network packets, host name, network addresses, communication protocols, interactions with other networks or devices, historical exchange data, documents, agreements, smart contracts, ledger information, and so on. In another example, physical or natural environment data can include, but is not limited to, biometric data (e.g., biological data such as, fingerprint, iris/retina, hand geometry, facial geometry, DNA, and so on, and behavioral data such as, gait, gesture, keystroke dynamics, speech pattern, foot movement pattern, etc.), weather conditions, geographic locations (e.g., latitude and longitude, triangulation), and so on. In yet another example, social environment data can include, but is not limited to, social media data (e.g., Facebook, Twitter, Snapchat, and TikTok), news feed data (e.g., articles, breaking news, and television content), and so on.

In some arrangements, the one or more processing circuits can establish, utilizing an application programming interface (API), a data feed associated with the attribute and can monitor the data feed including executing API calls with the API, where the API calls return the environmental data. In some arrangements, the environmental data can be selectively received based on the attributes of one or more digital assets stored on the provider ledger system 125. For example, the one or more processing circuits (e.g., in particular exchange interface 112) may query a John Doe's mobile phone (e.g., 140) for geolocation location information based on attribute X of digital asset A. In another example, the one or more processing circuits (e.g., in particular exchange interface 112) may query a news feed (e.g., 160) for stock information based on attribute Y of digital asset B. In yet another example, the one or more processing circuits (e.g., in particular exchange interface 112) may query Tom Toe (e.g., 170) for recent exchanges by Jane Doe based on attribute Z of digital asset C.

In various arrangements, the one or more processing circuits can receive, collect, and/or scan environmental data from a plurality of data channels. Each data channel of the plurality of data channels may be communicatively connected to the one or more processing circuits via a data channel communication network such that each data channel can be a computing device (e.g., user devices 140, central provider system 150, data sources 160, third-party devices 170, additional provider system 190) that can store, generate, and collect data. Further, the one or more processing circuits can also collect environmental data by querying a plurality of data sources (e.g., user devices 140, central provider system 150, data sources 160, third-party devices 170, additional provider system 190).

At block 235, the one or more processing circuits can determine the at least one condition of the attribute is satisfied based on the environmental data. In some arrangements, each digital asset can include attributes, where each attribute can include a plurality of conditions. The conditions can restrict one or more functionalities of the digital asset and can be satisfied based on determining the environment data satisfied at least one condition. In some arrangements, the digital asset functionalities can be compartmentalized such that various functionalities can be unlocked when at least on condition of an attribute is satisfied.

At block 240, the one or more processing circuits can, in response to determining the at least one condition of the attribute is satisfied, update the assignee field assigning the second assignee to the assignee field. As described above, a digital asset may have a plurality of fields that can be modifiable (e.g., added, removed, or updated) by the one or more processing circuits. In some arrangements, the updated of the assignee field can include updating the access to a digital asset such that the new assignee can exchange (and use) the digital asset. In various arrangements, the attributes may be deleted from the digital asset. The digital may retain one or more fields of the digital asset such as, but not limited to, the trace_ID, series, type, VUSD_Amount: 500, and so on. In some arrangements, the one or more processing circuit may, utilizing an API, communicate with a user device 140 (e.g., in particular I/O circuit 142) to modify the assignee associated with a digital asset stored in a digital wallet. In various arrangements, the update can include modifying a digital asset to include the second assignee on an asset ledger (e.g., provider digital asset ledger 128, inter-provider digital asset ledger 193, and so on). In some arrangements, the update can include generating a new public and private key pair for the second assignee different than the public and private key pair for the first assignee. In particular, the old public and private key pair may be deactivated or discarded such that it cannot be used to perform any additional exchanges. For example, the exchange system 114 may update the provider key dataset 127 to include the new public and private key pair and remove the old public and private key pair. Alternatively, the first assignee may still be able to use the old public and private key to make exchanges.

Additionally, the one or more processing can receive, from an additional provider system (e.g., 190 such as, but not limited to, grocery store, another bank, subscription service), an indication of a transaction associated with the digital asset. In turn, the one or more processing can transmit, to the additional provider system, the public key of the public and private key pair. Furthermore, in response to transmitting the public key, the one or more processing can update an internal ledger (e.g., 128) and/or update a central ledger (e.g., 158) associated with the central provider system 150. In some arrangements, the digital asset can be a CBDC issued by the central ledger (e.g., 158), such that the CBDC is a digital form of a fiat currency of one or more nations, one or more countries, or one or more regions. In various arrangements, the digital asset can be a token derived from a CBDC issued by the central ledger (e.g., 158), such that the token is a digital form of a fiat currency of one or more nations, one or more countries, or one or more regions. In various arrangements, digital assets stored on the central digital asset ledger 158 may be associated with an account such that a digital asset may have an account field. An account field can identify a provider or user associated with the digital such that the digital asset can be restricted from being transferred between the central provider and the provider or user identified in the account field. For example, provider system 110 may have an account at the central provider system 150 such that the central digital asset ledger 158 can have one or more digital assets associated with the account of the provider. In the following example, the provider system 110 may exchange digital assets (e.g., deposit, withdrawal) with the central provider system 150 (e.g., in particular central digital asset ledger 158) upon providing requests such as a withdrawal request or a deposit request.

Furthermore, each digital asset can include a plurality of fields, where each field of the plurality of fields is assigned an access level. For example, they may have a read/write access level, and the digital asset can include a trace field associated with a unique identifier and assigned a read access level. As shown the assignee field may be modified but the trace field may be immutable. In general, a plurality of digital assets can be stored on an internal ledger (e.g., 128, 193), such that each digital asset of the plurality of digital assets includes the plurality of fields, and where the plurality of fields includes at least the assignee field. Although various examples of fields and access levels are provided herein that are related to digital assets, it should be understood that the digital asset can include any type of field with any type of access level based on one or more preferences.

In some arrangements, the one or more processing circuits can identify a first assignee of the digital asset (e.g., after block 210). In various arrangements, prior to or after receiving the signed digital asset, the one or more processing circuits may receive a request to wrap one or more digital assets. That is, the request may include identifying information (e.g., name, birthday, SSN, DNA, account number, and so on) that can be used by the one or more processing circuits to identify the first assignee. In some arrangements, identifying the first assignee can be based on communication received from a user device 140 (e.g., customer of provider system 110) associated with an account stored in provider database 120. For example, the user device 140 may request (e.g., via an application, on a webpage) for an issuance of a digital asset prior to or after block 205. In another example, the first assignee may provide an account number (e.g., over network 130) upon request by the one or more processing circuits. In various arrangements, identifying the first assignee can be based on analyzing financial information and/or personal information stored in the provider database 120. For example, John Doe may have set an automatic conversation of all fiat currency to CBDC every five days. Additionally, the first assignee can be identified based on querying one or more databases (e.g., 120) or ledgers (e.g., 128, 193) to identify an account associated with the received request to wrap one or more digital assets. In some arrangements, the received digital asset at block 205 may already include an assignee field with an assigned assignee. Accordingly, the received digital asset may include various fields (e.g., unique or universal) based on the central provider system. In some implementations, the first assignee may be an entity with one or more employees.

In various arrangements, the first assignee may be identified, as well as one or more employees associated with the first assignee that have administrative access. That is, administrative access may include access to modify (e.g., add, remove, or update) digital assets associated with the entity (e.g., the first assignee). In particular, the administrative access may be based on an account of an employee and the modifying digital assets can be initiated by transmitting data to exchange interface 112 and/or the collection of data from user devices 140 (e.g., environmental data) by the exchange interface 112. For example, the dean of school may have administrative access to modify digital assets assigned to the school. In another example, the athletic director that administers athlete disbursements (e.g., for food, housing, academics) using digital assets may have administrative access to modify digital assets assigned to athletes. In yet another example, the chief financial officer (CFO) and the chief executive officer (CEO) may have administrative access to modify all digital assets assigned to any employee. In various arrangements, the first assignee field may include the assignee and the employees with administrative access.

Additionally, the one or more processing circuits can create a public and private key pair (e.g., after block 215). In some arrangements, the public and private key pair can be created based on encrypting the digital asset using one or more mathematical algorithm (e.g., Rivest-Shamir-Adleman (RSA), elliptic curve cryptography (ECC), digital signature algorithm (DSA), and so on). In particular, the public key and the private key of the public and private key pairs can be mathematically related based on a mathematical algorithm, such that a private key be used to encrypt data (e.g., such as digital asset) and the public key can be used to decrypt the data, or vice versa. In some arrangements, the digital asset may be configured based on a standardized language (e.g., key-value pairs, dictionaries, tables, mappings, pairings) for interpreting data (e.g., [trace_ID: UH78560B; Series: 2028B; Type: Provider Digital Asset; VUSD_Amount: 100]). In some arrangements, the public and private key pair can be stored in a key dataset (e.g., 127).

In some arrangements, the one or more processing circuits (e.g., in particular, the exchange interface 112) can store the digital asset (e.g., after block 215). In some arrangements, the digital asset may be stored in a node of the provider ledger (e.g., 128) associated with the assignee (e.g., account_ID). Alternatively, if the assignee does not currently have any digital assets on the ledger (e.g., only has a regular checking account), the one or more processing circuits can generate a unique account_ID or use the existing account_ID (sometimes generated at block 215) and create a new node (or use existing node) on the ledger. Accordingly, the new node or the existing node can store the digital asset. In some arrangements, the digital asset may be stored as a block in a blockchain stored on each node. That is, each node may store all exchanges that have occurred on the provider ledger such that each additional block is stored on each node of the provider ledger. In various arrangements, the one or more processing circuits may require a majority of the nodes on the provider ledger to agree the digital asset is valid before being stored on the provider ledger.

In various arrangements, the one or more processing circuits can identify the second assignee of the digital asset (e.g., after block 220). In various arrangements, prior to or after receiving the signed digital asset, the one or more processing circuits may receive a request to wrap one or more digital assets. That is, the request may include identifying information (e.g., name, birthday, SSN, DNA, account number, school identifier, and so on) that can be used by the one or more processing circuits to identify the second assignee. In some arrangements, identifying the second assignee can be based on communication received from a user device 140 (e.g., customer of provider system 110) associated with an account stored in provider database 120. For example, the communication may be received from the first assignee operating the first user device. In that following example, a user device 140 may request (e.g., via an application, on a webpage) for an issuance of a digital asset prior to or after block 205 to the second assignee. In another example, the second assignee may provide an account number (e.g., over network 130) upon a request by the one or more processing circuits. In various arrangements, identifying the second assignee can be based on analyzing financial information and/or personal information stored in the provider database 120. For example, the second assignee may be associated with a group such as athletes of a school. Additionally, the second assignee can be identified based on querying one or more databases (e.g., 120) or ledgers (e.g., 128, 193) to identify an account associated with the received request to wrap one or more digital assets.

Figure 3:
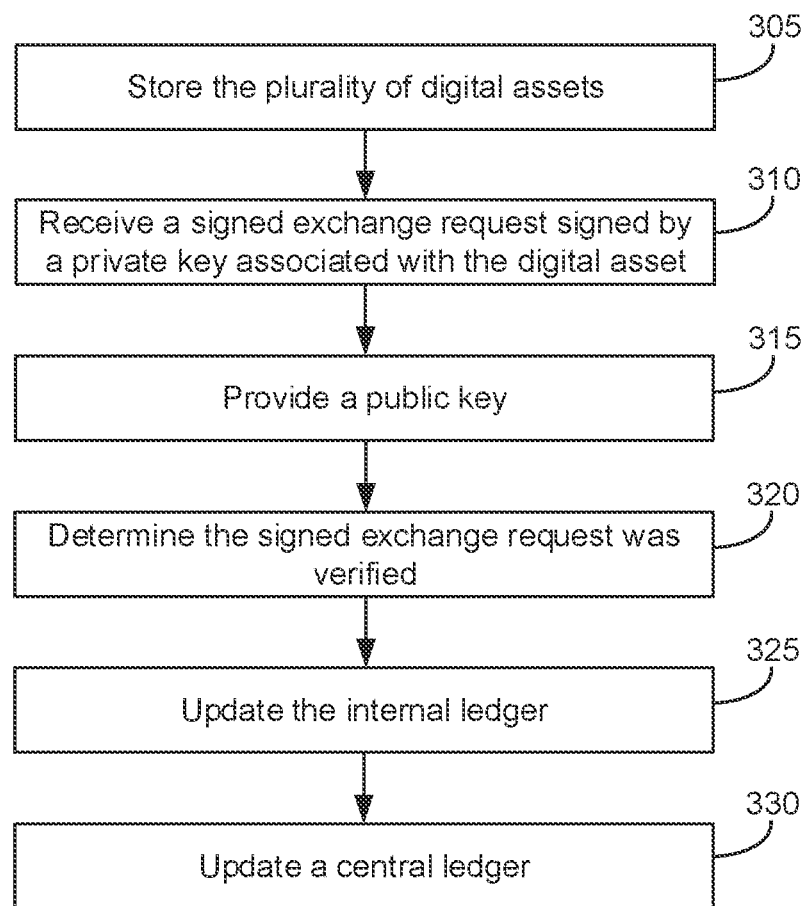
FIG. 3 is a flowchart for a method of exchanging digital assets, according to some arrangements.

Referring now to FIG. 3, a flowchart for a method 300 of exchanging digital assets is shown, according to some arrangements. Provider system 110 can be configured to perform method 300. Further, any computing device described herein can be configured to perform method 300.

In broad overview of method 300, at block 305, the one or more processing circuits (e.g., provider system 110 in FIG. 1) can store the plurality of digital assets. At block 310, the one or more processing circuits can receive a signed exchange request signed by a private key associated with a digital asset. At block 315, the one or more processing circuits can provide a public key. At block 320, one or more processing circuits can determine the signed exchange request was verified. At block 325, the one or more processing circuits can update the internal ledger. At block 330, the one or more processing circuits update a central ledger. Additional, fewer, or different operations may be performed depending on the particular arrangement. In some arrangements, some or all operations of method 300 may be performed by one or more processors executing on one or more computing devices, systems, or servers. In various arrangements, each operation may be re-ordered, added, removed, or repeated.

Referring to method 300 generally, exchanging digital assets can include receiving a signed exchange request associated with a provider-hosted wallet and/or self-hosted wallet. In particular, the provider-hosted wallet can be provided by the provider system 110 such that the provider system 110 can store the public and private key pairs of digital assets in provider key dataset 127. For example, a user device 140 may be able to connect (e.g., via a mobile application, via a website, via a secure connection, and so on) to the exchange interface 112 to perform an exchange using the public and private key pairs stored on the provider key dataset 127. Furthermore, the self-hosted wallet can be provided by user devices 140 such that each user device 140 can store the public and private key pairs of digital assets associated with a particular user. For example, instead the user device 140 communicating with the exchange interface 112 to access the public and private key pairs, the user device 140 may access public and private key pairs stored in a storage media of the user device 140. Thus, it should be understood that method 300 can be implemented using provider-hosted wallets and self-hosted wallets. Accordingly, method 300 is directed towards the PKC framework with various overlay ledgers for example, a federal overlay ledger that keeps track of all CBDCs, an inter-bank overlay ledger that keeps track of CBDC among banks, and a provider-specific overlay ledger used by the provider in dispersing the CBDCs to the users and the subsequent release of CBDC to the merchants and/or recipients.

Referring to method 300 in more detail, at block 305, the one or more processing circuits (e.g., provider system 110 in FIG. 1) can store a plurality of digital assets on an internal ledger. In some arrangements, each digital asset may be stored in a node of the provider ledger (e.g., 128). Storing may include generating one or more new nodes or using existing nodes already stored on the internal ledger. Accordingly, the new nodes or the existing nodes can store the digital assets. In some arrangements, the digital asset may be stored as a block in a blockchain stored on each node. That is, each node may store all exchanges that have occurred on the internal ledger such that each additional block is stored on each node of the internal ledger. In various arrangements, the one or more processing circuits may require a majority of the nodes on the internal ledger to agree the digital asset is valid before storing it on the internal ledger. In some arrangement, each digital asset may be encrypted using a public and private key pair before storing it on the internal ledger. The public and private key pairs of the plurality of digital assets can be stored in provider key dataset 127.

At block 310, the one or more processing circuits can receive a signed exchange request signed by a private key of a public and private key pair associated with a digital asset on the internal ledger, wherein the signed exchange request includes a destination address of an inter-provider ledger. For example, the signed exchange request can be for a good or service provided by another party. In some arrangements, each address (e.g., destination, source, central) described herein may be a node of a plurality of nodes on a ledger. For example, the signed exchange request can include a source address associated with a first node on the inter-provider ledger, and the destination address can be a second node on the inter-provider ledger. In some arrangements, the public and private key pair can be an encrypted digital asset based on using one or more mathematical algorithm (e.g., Rivest-Shamir-Adleman (RSA), elliptic curve cryptography (ECC), digital signature algorithm (DSA), and so on). In particular, the public key and the private key of the public and private key pairs can be mathematically related based on a mathematical algorithm, such that a private key be used to encrypt data (e.g., such as digital asset) and the public key can be used to decrypt the data, or vice versa. In some arrangements, the private key of a public and private key pair can be stored in provider key dataset 127 by provider system 110 (e.g., provider-hosted wallet) operated by a provider, such that signing the digital asset can include hashing (e.g., with a hash function) and/or encrypting with the private key of a public and private key pair associated with the digital asset). In some arrangements, the private key of a public and private key pair can be stored by user device 140 (e.g., self-hosted wallet) operated by a user, such that signing the digital asset can include encrypting the digital asset with the private key and providing the public key and signed digital asset to another system described herein such that it can be verified and transferred.

At block 315, the one or more processing circuits can provide, to the inter-provider ledger, a public key of the public and private key pair based on interfacing with the destination address of the inter-provider ledger via a first application programming interface (API). In some arrangements, the one or more processing circuits can establish, utilizing an application programming interface (API), a data feed with the inter-provider ledger and execute API calls with the first API, where the API calls can update the inter-provider ledger. For example, the one or more processing circuits can execute update API calls that return a successful or unsuccessful response from the inter-provider ledger (e.g., 193). In various arrangements, the API calls can include various querying, updating, storing calls that can return various data such as, but not limited to, digital asset keys, successful/unsuccessful update response, successful/unsuccessful storage response, requested data (e.g., assignee field, VUSD_amount, trace_ID, etc.), and so on.

At block 320, the one or more processing circuits can determine, from the inter-provider ledger, the signed exchange request was verified. As described above, verification across ledgers can include utilizing a plurality number of encryption algorithms that can be performed on the digital asset to sign and verify the digital assets (with reference to block 210). In some arrangements, the signed exchange request can be signed by the payor (e.g., provider system 110) utilizing a private key stored on the provider key dataset 127 and the signed exchange request can be encrypted by the private key and received with a public key for verifying the signed exchange request (e.g., by an additional provider system 190. For example, a payor bank can provide a signed exchange request and a public key to a payee bank such that the digital asset (e.g., CBDC) can be verified and transferred (e.g., stored in additional provider digital asset ledger 198). In various arrangements, the provider system 110 may also hash the signed exchange request prior to signing and/or after signing.

At block 325, the one or more processing circuits can, in response to determining that the signed exchange request was verified, update the internal ledger by removing the public and private key pair. As described above, a digital asset may be encrypted with a public and private key pair by the one or more processing circuits. In some arrangements, the removal can include erasing the public and private key pair from the internal ledger. In particular, the old public and private key pair may be deactivated or discarded such that it cannot be used to perform any additional exchanges. Alternatively, the removal can include decrypting the digital asset and modifying one or more fields of the digital asset such that the digital asset is associated with a monetary value of $0 USD.

At block 330, the one or more processing circuits can, in response to determining that the signed exchange request was verified, update a central ledger by interfacing with a central address of the central ledger via a second API. In some arrangements, the one or more processing circuits can establish, utilizing an application programming interface (API), a data feed with the central ledger and execute API calls with the second API, where the API calls can update the central ledger. For example, the one or more processing circuits can execute update API calls that return a successful or unsuccessful response from the central provider ledger (e.g., 158). In various arrangements, the API calls can include various querying, updating, storing calls that can return various data. With reference to block 315 and 330, it should be understood that each ledger described herein can have a unique API with specific API calls and API returns. For example, the central provider system 150 may implement central digital asset ledger 158 and broadcast or provide central ledger API call data for interacting with the central digital asset ledger 158 using central ledger API calls. In another example, the provider system 110 may implement inter-provider digital asset ledger 193 and broadcast or provide inter-provider ledger API call data for interacting with the inter-provider digital asset ledger 193 using inter-provider ledger API calls.

Figure 4:
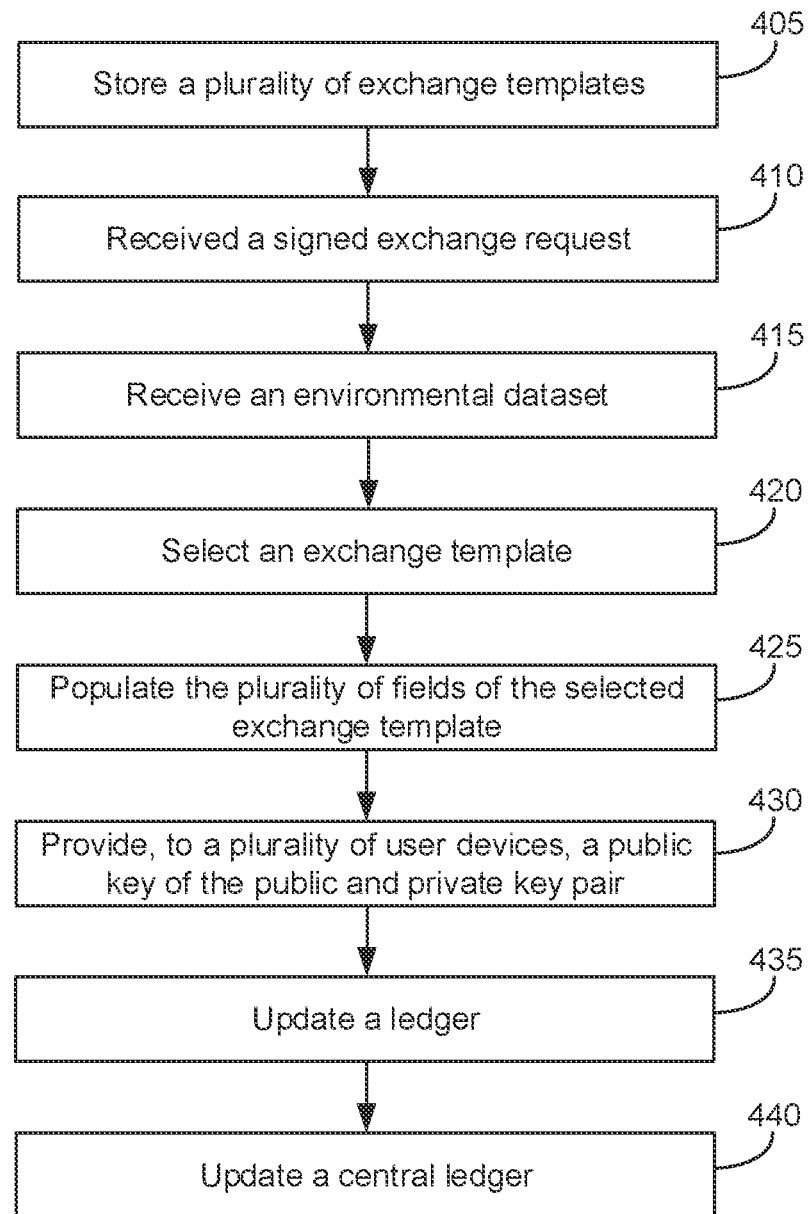
FIG. 4 is another flowchart for a method of exchanging digital assets, according to some arrangements.

Referring now to FIG. 4, another flowchart for a method 400 of exchanging digital assets is shown, according to some arrangements. Provider system 110 can be configured to perform method 400. Further, any computing device described herein can be configured to perform method 400.

In broad overview of method 400, at block 405, the one or more processing circuits (e.g., provider system 110 in FIG. 1) can store a plurality of exchange templates. At block 410, the one or more processing circuits can receive a signed exchange request. At block 415, the one or more processing circuits can receive an environmental dataset. At block 420, one or more processing circuits can select an exchange template. At block 425, the one or more processing circuits can populate the plurality of fields of the selected exchange template. At block 430, the one or more processing circuits can provide, to a plurality of user devices, a public key of the public and private key pair. At block 435, the one or more processing circuits can update a ledger. At block 440, the one or more processing circuits can update a central ledger. Additionally, fewer, or different operations may be performed depending on the particular arrangement. In some arrangements, some or all operations of method 400 may be performed by one or more processors executing on one or more computing devices, systems, or servers. In various arrangements, each operation may be re-ordered, added, removed, or repeated.

Referring to method 400 generally, transferring digital asset (e.g., CBDC) to multiple parties in one exchange or in response to receiving environmental datasets. In particular, an exchange template may be selected, where the template can specify one or more of at least one of the recipients and payment amounts. Accordingly, method 400 is directed towards a template-based digital asset transfer mechanism involving a single debit from an account of a user and multiple credits for multiple recipients. In some arrangements, the exchange templates can correspond to a type of commercial exchange. For example, an exchange template for ride sharing may include fair for the driver, toll roads and taxes, and the exchange template may be specific to a region (e.g., Los Angeles, Dallas-Fort Worth, Chicago) due to difference in toll roads and taxes, and so on. In another example, an exchange template for P2P rental services may include rent for the landlord, taxes for local government, clearing fees, utility fees, and so on. In response to receiving a signed exchange request, an exchange template may be automatically selected and a plurality of fields of the exchange template may be populated, and in response to determining fulfillment (e.g., execution of a smart contract), the provider system 110 can debit the account of the users and then credit the accounts of the recipients.

Referring to method 400 in more detail, at block 405, the one or more processing circuits (e.g., provider system 110 in FIG. 1) can store a plurality of exchange templates (e.g., in template dataset 122), wherein each exchange template of the plurality of exchange templates includes a plurality of fields, and wherein the plurality of fields includes at least two or more payee fields. Each exchange template can include a plurality of fields and smart contracts that can execute code to perform one or more tasks. In particular, wherein each field of the plurality of fields in the exchange template is assigned an access level. For example, the exchange template can include at least two or more payee fields have a read/write access level, and a trace field associated with a unique identifier and assigned a read access level.

At block 410, the one or more processing circuits can receive a signed exchange request signed by a private key of a public and private key pair associated with a digital asset. The digital asset can be owned by a user or customer with an account at the provider system (e.g., 110). In some arrangements, the digital asset may be stored on provider digital asset ledger 128. As described above, verification across ledgers can include utilizing a plurality number of encryption algorithms that can be performed on the digital asset to sign and verify the digital assets (with reference to block 210). In some arrangements, the signed exchange request can be signed by the payor (e.g., user device 140) utilizing a private key stored on the user device 140 and the signed exchange request can be encrypted by the private key and received with a public key for verifying the signed exchange request. In various arrangements, the user device 140 may also hash the signed exchange request prior to signing and/or after signing.

At block 415, the one or more processing circuits can receive an environmental dataset. As described above, an environment can include, but is not limited to, network or virtual environment, physical or natural environment, or social environment. The one or more devices and/or systems described herein can use one or more input devices to collect and aggregate the environmental data into an environmental dataset. In some arrangements, the one or more processing circuits can establish, utilizing an application programming interface (API), a data feed associated with the exchange templates and can monitor the data feed including executing API calls with the API, where the API calls return the environmental dataset. In some arrangements, the environmental datasets can be selectively received based on receiving a signed exchange request (e.g., Block 410). The environmental dataset can include, but is not limited to, information associated with the signed exchange request. For example, upon receiving a signed exchange request associated with a ride share exchange, the environmental dataset may be provided (or collected/accessed by the one or more processing circuits) by the user device 140 that can include trip information, location information, cost information, tax information, recipient information, and so on. In another example, upon receiving a signed exchange request associated with a hotel reservation, the environmental dataset may be provided (or collected/accessed by the one or more processing circuits) by the third-party devices 170 (e.g., such as a hotel system) that can include reservation information, location information, cost information, tax information, recipient information, and so on. In some arrangements, the signed exchange request and environmental dataset can be provided as a data package (e.g., Block 410 and 415 can be received at the same time). In various arrangements, environmental data may be received from various sources and aggregated to generate an environmental dataset.

In general, the one or more processing circuits can receive, collect, and/or scan environmental data from a plurality of data channels. Each data channel of the plurality of data channels may be communicatively connected to the one or more processing circuits via a data channel communication network such that each data channel can be a computing device (e.g., user devices 140, central provider system 150, data sources 160, third-party devices 170, additional provider system 190) that can store, generate, and collect data. Further, the one or more processing circuits can also collect environmental datasets by querying a plurality of data sources (e.g., user devices 140, central provider system 150, data sources 160, third-party devices 170, additional provider system 190).

At block 420, the one or more processing circuits can select, utilizing the environmental dataset, an exchange template of the plurality of exchange templates (e.g., stored in template dataset 122). Selecting a template can include matching the environmental data stored in the environmental dataset with the plurality of exchange templates to determine a match. In general, an exchange template can include one or more data structures with one or more parameters that may include a state. For example, an exchange template may include a state parameter (e.g., Location: Texas (parameter: state)) such that when the environmental data indicates the location is in Texas, the state parameter would be true (or 1) for Texas. Accordingly, the exchange template may include parameters for each state within the US or country. Additionally, the exchange template may include a transaction type parameter (e.g., transaction: gig-economy) such that when the environmental data indicates the transaction type of gig-economy, the transaction type parameter would be true (or 1) for gig-economy. Furthermore, the exchange template may include a business parameter (e.g., business: WF Bank) such that when the environmental data indicates the business of a transaction, the business type parameter would be true (or 1) for WF Bank. As shown, the exchange template can include a plurality of parameters with or without states such that the one or more processing circuits can select an exchange template based on the received environmental data.

In various arrangement, the selected exchange template can be based on utilizing a processing algorithm or a matching algorithm (e.g., stored a database described herein). The processing algorithm or a matching algorithm could be based on artificial intelligence or a machine-learning model. For example, a first machine-learning model may be trained to identify particular environmental data of the environmental dataset (e.g., type of exchange, location of exchange, amount of exchange, recipients of the exchange) and output a prediction. In other examples, a machine-learning model may be trained to select the exchange template that matches the received environmental dataset. In various arrangements, selecting the exchange template can include utilizing a machine learning algorithm (e.g., a neural network, convolutional neural network, recurrent neural network, linear regression model, and sparse vector machine). The one or more processing circuits can input environmental data into the machine learning model, and receive an exchange template from the model indicating if there is a match. In some arrangements, the one or more processing circuits may utilize various algorithms to execute the matching algorithm for a plurality of environmental dataset to select the exchange template.

In some arrangements, one or more processing circuits can receive additional environmental dataset (e.g., at the same time as block 415, after block 420). In some arrangements, the additional environmental dataset (as well as the environmental dataset) can be used to populate the plurality of fields described below with reference to block 425. For example, the environmental dataset (received at block 415) could include a restaurant's point-of-sale (POS) IP address that could be used by the one or more processing circuits to identify a location of the transaction and a merchant identity. In particular, the environmental dataset could be used by the one or more processing circuits to select the exchange template. In the same example, the additional environmental dataset could include student information of the student attempting to make a purchase at the restaurant's POS. In particular, the student may have an allotted amount of money to spend on food (e.g., from a school scholarship, distributed by an athletic program of the school) and the additional environmental dataset could include a geolocation of the student's phone, an IP address of school's computing system, and the restaurant's POS IP address. As shown, the additional environmental dataset could be used by the one or more processing circuits to populate the plurality of fields in block 425. In some arrangements, the additional environmental dataset can be received at the same time as the environmental dataset. In various arrangements, the additional environmental dataset can include the same or similar data as the environmental dataset (block 415). For example, the additional environmental dataset can include at least geographic location data and at least two payees. In some arrangements, at least a portion of the environmental dataset and the additional environmental dataset is the same. In some arrangements, in response to selecting the exchange template, the one or more processing circuits can collect the additional environmental dataset based on interfacing with a user device associated with the private key and via an API.

At block 425, the one or more processing circuits can populate the plurality of fields of the selected exchange template based on the environmental dataset. In some arrangement, each exchange template execute a smart contract configured to execute in response to populating the plurality fields of the smart contract. The smart contract execution can include performing the following blocks (430, 435, 440). In some arrangements, populating can include cross-referring the environmental dataset and/or additional environmental dataset with a lookup table including a plurality of metadata fields stored in one or more data sources and selecting one or more metadata fields to populate the plurality of fields of the selected exchange template. In some arrangements, the selected exchange template can have a plurality of metadata fields that can be empty upon selection and populated using the environmental dataset, additional environmental dataset, data sources 160, and/or other data described herein (e.g., stored in the provider database 120, ledger systems, etc.). For example, the selected exchange template can include a transaction type field (e.g., e-commerce, gig-economy, subscription, and so on), a value field (e.g., amount of the transaction), a location field and/or location fields (e.g., city, county, state, country), payee fields, payor fields, and so on.

At block 435, the one or more processing circuits can provide, to a plurality of user devices associated with a plurality of payees associated with a first payee of the at least two or more payee fields of the exchange template, a public key of the public and private key pair based on interfacing with a destination address via an application programming interface (API). For example, the plurality of user devices can include a first device and a second device. The first user device may be associated with a first payee of the at least two or more payee fields of the exchange template and can be interfaced with utilizing a first destination address via a first API. The second user device may associated with a second payee of the at least two or more payee fields of the exchange template and can be interfaced with utilizing a second destination address via a second API (different than the first destination address and the first API). The facilitation of communication can be implemented as an application programming interface (API) (e.g., REST API, Web API, customized API), batch files, SDK, and/or queries. In various arrangements, the data acquisition engine 180 can also be configured to control access to resources of the data protection system 110 and data protection database 120. In particular, the data acquisition engine 180 may provide a single application programming interface (API) or multiple APIs to access various data generated, stored, or routed by devices and systems 140, 150, 170, 190, and/or by the data sources 160.

At block 435 and 440, the one or more processing circuits can, in response to receiving the indication that the signed exchange request was verified by at least one of the plurality of user devices, update a ledger by removing the public and private key pair and update a central ledger by interfacing with a central address of the central ledger via a second API. As described above, a digital asset may be associated with a public and private key pair such that it can be used in exchanges. Accordingly, at block 435 the one or more processing circuit can remove the public and private key pair from the template dataset 122 associated with the customer or user of the signed exchange request. Furthermore, the central ledger may have issue one or more digital assets to the one or more processing circuits and store a record of the issuances of the digital assets for, but not limited to, auditing purposes, historical references, liability. In some arrangements, the record of issuance can be stored on the central digital asset ledger 158. Accordingly, at block 440 the one or more processing circuits can update, utilizing a unique API, the record of issuances to reflect the exchange of the digital asset to at least one of the first user device or the second user device. In some arrangements, if the at least one of the first user device or the second user device have accounts with the one or more processing circuits block 440 may not be performed. That is, if an exchange does not transfer digital assets (e.g., CBDC) from the provider to an additional provider or digital wallet, the one or more processing circuits may delete the public and private key pair associated with the digital asset of the customer or user of the signed exchange request.

In some arrangements, the one or more processing circuits can track the utilization of a digital asset (e.g., public and private key signing and verifying) on one or more ledgers described herein or the utilization of an exchange template. For example, a college athlete may have one or more digital assets distributed by the school for use on various exchanges (e.g., food, school supplies, housing, monthly expenses). In the following example, the one or more processing circuits could utilize the unique identifier associated with the trace field of the exchange template to track (e.g., record/store in the template dataset 122) each time an exchange template is selected and the individuals (payors and payees) associated with the exchange. Additionally, the one or more processing circuits could utilize the unique identifier associated with a field of a digital asset to track (e.g., record/store in the provider ledger system 125) each time a digital asset changes in value or is used in an exchange and the individuals (payors and payees) associated with the value change or exchange.

Figure 5:
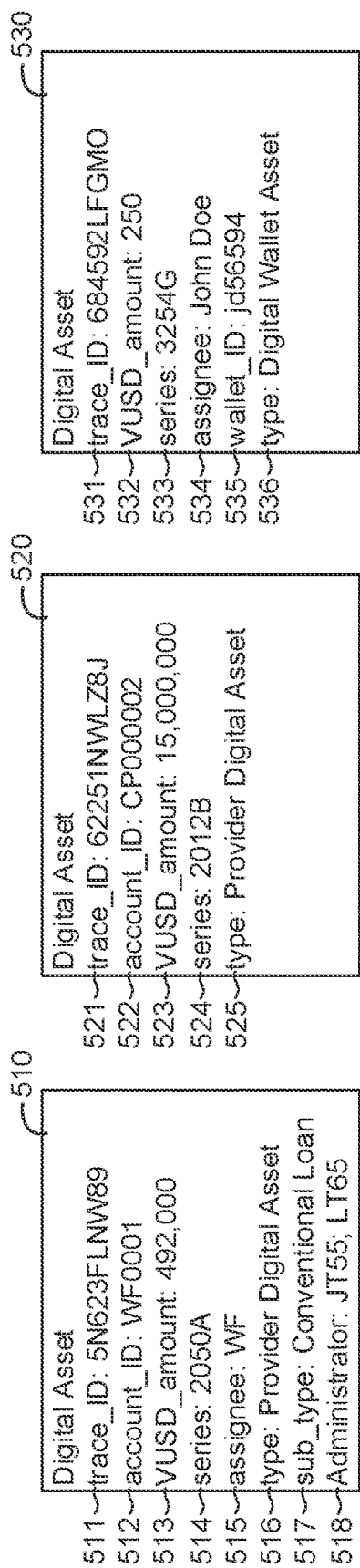
FIG. 5 a block diagram depicting an example of digital assets in connection with the cryptography framework of FIG. 1, according to some arrangements.

Referring now to FIG. 5, a block diagram depicting an example of digital assets (e.g., 510, 520, 530) in connection with the cryptography framework of FIG. 1 is shown, according to some arrangements. As shown, in some arrangements, digital assets can include various fields based on who has ownership of the digital asset. In particular, ownership can include storing the digital asset on a ledger (e.g., 128, 158, 193, 198) or storage device (e.g., digital wallet) of a computing system/device described herein. In various arrangements, a digital asset can include fields specific to each user or entity, and each user and/or entity can wrap assets to include attributes that can restrict the functionality of the digital asset. For example, digital asset 510 (e.g., owned by a provider) can include a plurality of fields (e.g., 511, 512, 513, 514, 515, 516, 517, 518) unique to the type 516. In the following example, field 518 can include the accounts of an assignee (e.g., employer) that can have administrative access and modify one or more fields of the digital asset. In another example, digital asset 520 (e.g., owned by a central provider) can include a plurality of fields (e.g., 521, 522, 523, 524, 525) unique to the type 525. In yet another example, digital asset 530 (e.g., owned by a user) can include a plurality of fields (e.g., 531, 532, 533, 534, 535, 536) unique to the digital wallet of the user device (e.g., 140). Also as shown, some fields may be immutable and consistent across all digital assets (e.g., 511, 521, 531). For example, central provider system 150 may set one or more read only fields of a digital asset before transferring or transmitting assets from the central digital asset ledger 158.

Figure 6:
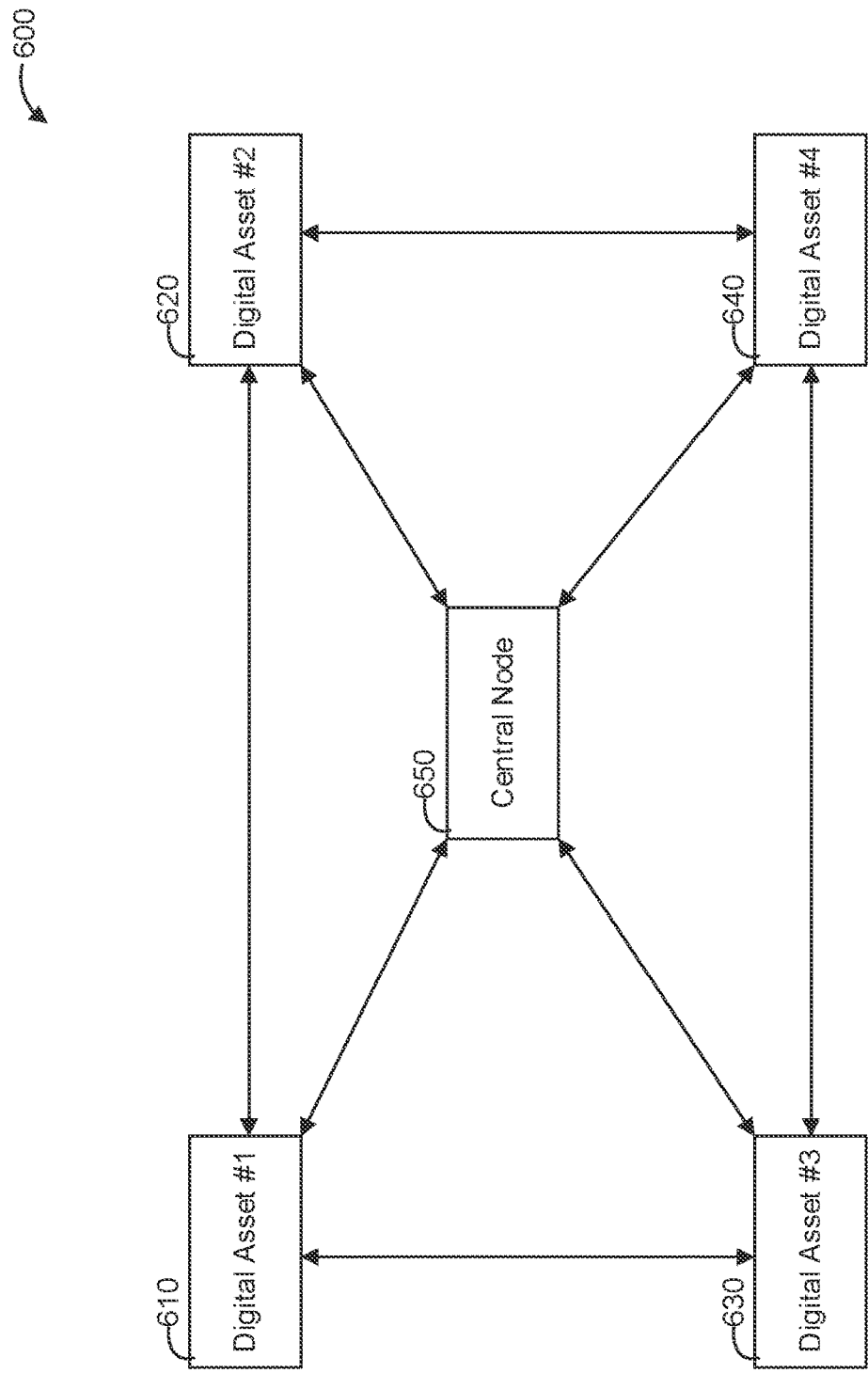
FIG. 6 is a block diagram depicting an example of a ledger in connection with the cryptography framework of FIG. 1, according to some arrangements.

Referring now to FIG. 6, a block diagram depicting an example of a ledger (e.g., 128, 158, 193, 198) in connection with the cryptography framework of FIG. 1 is shown, according to some arrangements. In some arrangements, the ledger 600 can include one or more nodes 610, 620, 630, 640 (collectively referred to herein as "ledger nodes"). As shown, each node can be a digital asset on ledger 600 such that a plurality of digital assets can be interconnected with a central node 650 or interconnected with one another to form a peer-to-peer network (not shown). In some arrangements, the ledger nodes and central node 650 can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks). In various arrangements, the ledger 600 may not include a central node 650 such that the ledger nodes can be interconnected together. In some arrangements, the provider system 110 (or 150, 190) can generate digital assets and store the digital assets on ledger 600.

Figure 7:
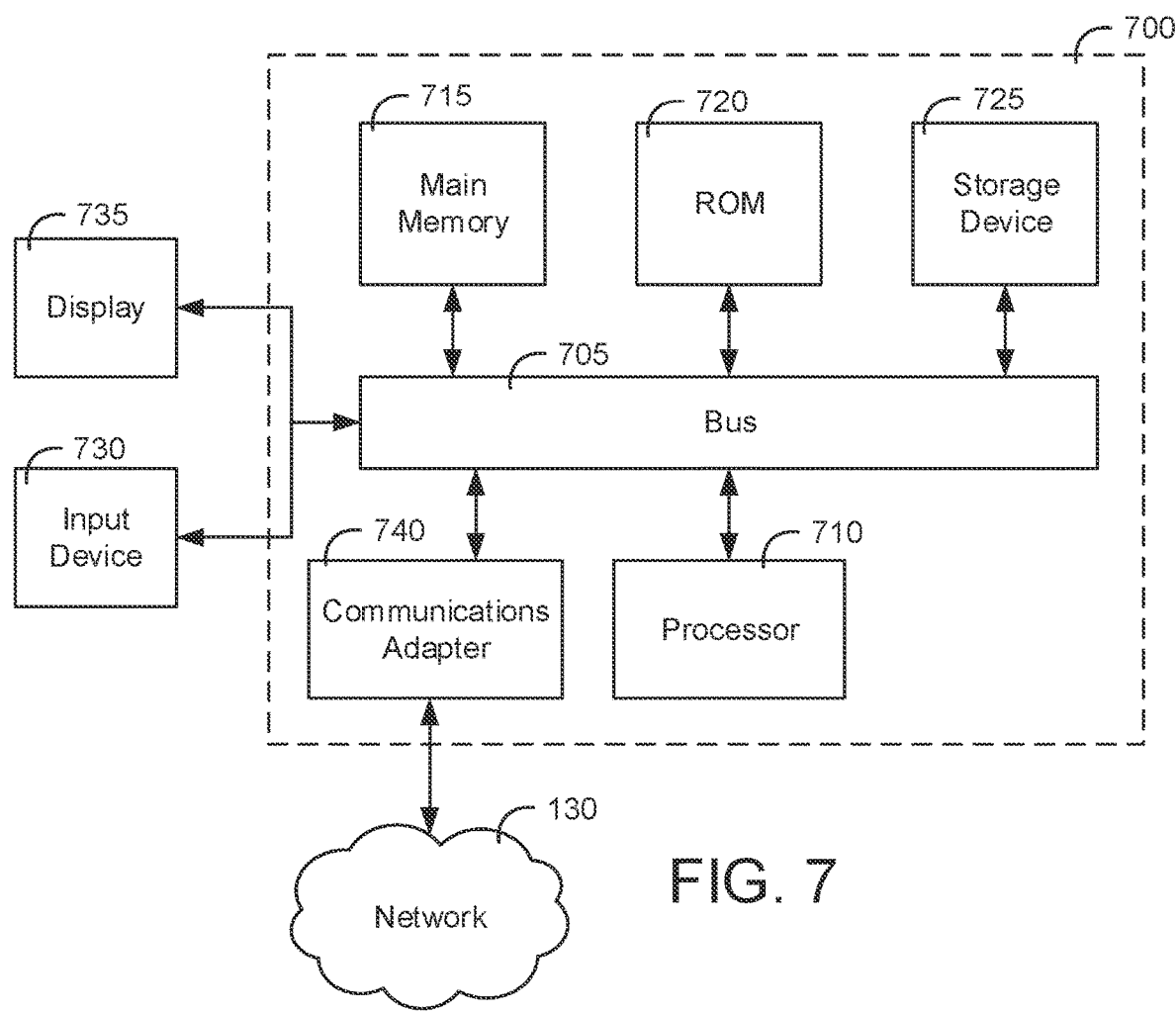
FIG. 7 is a block diagram illustrating an example computing system suitable for use in the various arrangements described herein.

Referring now to FIG. 7, a depiction of a computer system 700 is shown. The computer system 700 that can be used, for example, to implement a computing environment 100, provider computing system 110, user devices 140, central provider system 150, data sources 160, third-party devices 170, additional provider systems 190, and/or various other example systems described in the present disclosure. The computing system 700 includes a bus 705 or other communication component for communicating information and a processor 810 coupled to the bus 705 for processing information. The computing system 700 also includes main memory 715, such as a random-access memory (RAM) or other dynamic storage device, coupled to the bus 705 for storing information, and instructions to be executed by the processor 810. Main memory 715 can also be used for storing position information, temporary variables, or other intermediate information during execution of instructions by the processor 810. The computing system 700 may further include a read only memory (ROM) 720 or other static storage device coupled to the bus 705 for storing static information and instructions for the processor 810. A storage device 725, such as a solid-state device, magnetic disk, or optical disk, is coupled to the bus 705 for persistently storing information and instructions.

The computing system 700 may be coupled via the bus 705 to a display 735, such as a liquid crystal display, or active matrix display, for displaying information to a user.

An input device 730, such as a keyboard including alphanumeric and other keys, may be coupled to the bus 705 for communicating information, and command selections to the processor 810. In another arrangement, the input device 730 has a touch screen display 735. The input device 730 can include any type of biometric sensor, a cursor control, such as a mouse, a trackball, or cursor direction keys, for communicating direction information and command selections to the processor 810 and for controlling cursor movement on the display 735.

In some arrangements, the computing system 700 may include a communications adapter 740, such as a networking adapter. Communications adapter 740 may be coupled to bus 705 and may be configured to enable communications with a computing or communications network 130 and/or other computing systems. In various illustrative arrangements, any type of networking configuration may be achieved using communications adapter 740, such as wired (e.g., via Ethernet), wireless (e.g., via Wi-Fi, Bluetooth), satellite (e.g., via GPS) pre-configured, ad-hoc, LAN, and WAN.

According to various arrangements, the processes that effectuate illustrative arrangements that are described herein can be achieved by the computing system 700 in response to the processor 810 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 7, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 7 as singular, stand-alone devices, one of ordinary skill in the art will appreciate that, in some arrangements, the computing system 700 may include virtualized systems and/or system resources. For example, in some arrangements, the computing system 700 may be a virtual switch, virtual router, virtual host, or virtual server. In various arrangements, computing system 700 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying FIGS. do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, and/or sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A computer-implemented method of exchanging digital assets using a public key cryptography (PKC) framework, the method comprising:
    encrypting, by one or more processing circuits, a plurality of digital assets on an internal ledger using a public key of a public and private key pair;
    storing, by the one or more processing circuits, the encrypted plurality of digital assets on the internal ledger;
    receiving, by the one or more processing circuits, a signed exchange request signed by a private key of the public and private key pair associated with an encrypted digital asset on the internal ledger, wherein the signed exchange request comprises a destination address of an inter-provider ledger;
    providing, by the one or more processing circuits to the inter-provider ledger, the public key of the public and private key pair based on interfacing with the destination address of the inter-provider ledger via a first application programming interface (API) based on establishing a first data feed;
    determining, by the one or more processing circuits from the inter-provider ledger, the signed exchange request was verified, wherein the signed exchange request is verified using one or more cryptographic functions on the inter-provider ledger;
    transferring, by the one or more processing circuits, the encrypted digital asset to the inter-provider ledger:
    in response to determining that the signed exchange request was verified, updating, by the one or more processing circuits, the internal ledger by removing the public and private key pair; and
    in response to determining that the signed exchange request was verified, updating, by the one or more processing circuits, a central ledger by interfacing with a central address of the central ledger via a second API based on establishing a second data feed;
    wherein the encrypted digital asset comprises a plurality of fields that are ledger dependent, wherein at least one of the plurality of fields is a universal field across the internal ledger, the inter-provider ledger, and the central ledger, and wherein at least one of the fields of the plurality fields is a unique field to the internal ledger.

2. The computer-implemented method of claim 1, wherein each encrypted digital asset of the encrypted plurality of digital assets comprises the plurality of fields, and wherein the plurality of fields comprises at least an assignee field.

3. The computer-implemented method of claim 2, wherein the assignee field has a read/write access level, and wherein the encrypted digital asset further comprises a trace field associated with a unique identifier and assigned a read access level.

4. The computer-implemented method of claim 1, wherein the encrypted digital asset is a central bank digital currency (CBDC) issued by the central ledger, and wherein the CBDC is a digital form of a fiat currency of one or more nations, one or more countries, or one or more regions.

5. The computer-implemented method of claim 4, wherein the central ledger comprises a plurality of nodes each associated with one or more providers, and wherein the central address is unique to the one or more processing circuits, and wherein the one or more processing circuits comprises a read/write access level for updating the central ledger.

6. The computer-implemented method of claim 1, wherein the encrypted digital asset is a token derived from a central bank digital currency (CBDC) issued by the central ledger, and wherein the token is a digital form of a fiat currency of one or more nations, one or more countries, or one or more regions.

7. The computer-implemented method of claim 1, further comprising:
   establishing, by the one or more processing circuits utilizing the first API, the first data feed associated with the signed exchange request; and
   monitoring, by the one or more processing circuits, the first data feed comprising executing API calls with the API, wherein the API calls return a verification status of the signed exchange request.

8. The computer-implemented method of claim 1, wherein the internal ledger is operated by the one or more processing circuits, and wherein the inter-provider ledger comprises a plurality of nodes each associated with one or more providers.

9. The computer-implemented method of claim 8, wherein a source address associated with the one or more processing circuits is a first node of the plurality of nodes on the inter-provider ledger, and wherein the destination address is a second node of the plurality of nodes on the inter-provider ledger.

10. A provider system comprising:
    at least one processing circuit having at least one processor coupled to at least one memory, the at least one processing circuit configured to:
       encrypt a plurality of digital assets on an internal ledger using a public key of a public and private key pair;
       store the encrypted plurality of digital assets on the internal ledger;
       receive a signed exchange request signed by a private key of the public and private key pair associated with an encrypted digital asset on the internal ledger, wherein the signed exchange request comprises a destination address of an inter-provider ledger;
       provide, to the inter-provider ledger, the public key of the public and private key pair based on interfacing with the destination address of the inter-provider ledger via a first application programming interface (API) based on establishing a first data feed;
       determine, from the inter-provider ledger, the signed exchange request was verified, wherein the signed exchange request is verified using one or more cryptographic functions on the inter-provider ledger;
       transfer the encrypted digital asset to the inter-provider ledger;
       in response to determining that the signed exchange request was verified, update the internal ledger by removing the public and private key pair; and
       in response to determining that the signed exchange request was verified, update a central ledger by interfacing with a central address of the central ledger via a second API based on establishing a second data feed;
    wherein the encrypted digital asset comprises a plurality of fields that are ledger dependent, wherein at least one of the plurality of fields is a universal field across the internal ledger, the inter-provider ledger, and the central ledger, and wherein at least one of the fields of the plurality fields is a unique field to the internal ledger.

11. The provider system of claim 10, wherein each encrypted digital asset of the encrypted plurality of digital assets comprises the plurality of fields, and wherein the plurality of fields comprises at least an assignee field.

12. The provider system of claim 11, wherein the assignee field has a read/write access level, and wherein the encrypted digital asset further comprises a trace field associated with a unique identifier and assigned a read access level.

13. The provider system of claim 10, wherein the encrypted digital asset is a central bank digital currency (CBDC) issued by the central ledger, and wherein the CBDC is a digital form of a fiat currency of one or more nations, one or more countries, or one or more regions.

14. The provider system of claim 13, wherein the central ledger comprises a plurality of nodes each associated with one or more providers, and wherein the central address is unique to the at least one processing circuit, and wherein the at least one processing circuit comprises a read/write access level for updating the central ledger.

15. The provider system of claim 10, wherein the encrypted digital asset is a token derived from a central bank digital currency (CBDC) issued by the central ledger, and wherein the token is a digital form of a fiat currency of one or more nations, one or more countries, or one or more regions.

16. The provider system of claim 10, wherein the at least one processing circuit is further configured to:
    establish, utilizing the first API, the first data feed associated with the signed exchange request; and
    monitor the first data feed comprising executing API calls with the API, wherein the API calls return a verification status of the signed exchange request.

17. The provider system of claim 10, wherein the internal ledger is operated by the at least one processing circuit, and wherein the inter-provider ledger comprises a plurality of nodes each associated with one or more providers.

18. The provider system of claim 17, wherein a source address associated with the at least one processing circuit is a first node of the plurality of nodes on the inter-provider ledger, and wherein the destination address is a second node of the plurality of nodes on the inter-provider ledger.

19. One or more non-transitory computer-readable storage media having instructions stored thereon that, when executed by at least one processing circuit, cause the at least one processing circuit to:
    encrypt a plurality of digital assets on an internal ledger using a public key of a public and private key pair;
    store the encrypted plurality of digital assets on the internal ledger;
    receive a signed exchange request signed by a private key of the public and private key pair associated with an encrypted digital asset on the internal ledger, wherein the signed exchange request comprises a destination address of an inter-provider ledger;
    provide, to the inter-provider ledger, the public key of the public and private key pair based on interfacing with the destination address of the inter-provider ledger via a first application programming interface (API) based on establishing a first data feed;
    determine, from the inter-provider ledger, the signed exchange request was verified, wherein the signed exchange request is verified using one or more cryptographic functions on the inter-provider ledger;
transfer the encrypted digital asset to the inter-provider ledger;
in response to determining that the signed exchange request was verified, update the internal ledger by removing the public and private key pair; and
in response to determining that the signed exchange request was verified, update a central ledger by interfacing with a central address of the central ledger via a second API based on establishing a second data feed;
wherein the encrypted digital asset comprises a plurality of fields that are ledger dependent, wherein at least one of the plurality of fields is a universal field across the internal ledger, the inter-provider ledger, and the central ledger, and wherein at least one of the fields of the plurality fields is a unique field to the internal ledger.

20. The one or more non-transitory computer-readable storage media of claim 19, wherein the internal ledger is operated by the at least one processing circuit, and wherein the inter-provider ledger comprises a plurality of nodes each associated with one or more providers, and wherein a source address associated with the at least one processing circuit is a first node of the plurality of nodes on the inter-provider ledger, and wherein the destination address is a second node of the plurality of nodes on the inter-provider ledger.

* * * * *